United States Patent [19]
Usui et al.

[11] Patent Number: 6,038,244
[45] Date of Patent: Mar. 14, 2000

[54] SEMICONDUCTOR EXCITATION SOLID-STATE LASER APPARATUS

[75] Inventors: Akaru Usui; Shinji Sato; Hisao Tanaka, all of Nagoya, Japan

[73] Assignee: Mitsubishi Denki Kabushiki Kaisha, Tokyo, Japan

[21] Appl. No.: 09/016,282

[22] Filed: Jan. 30, 1998

[30] Foreign Application Priority Data

Jun. 26, 1997 [JP] Japan ................................ 9-170547

[51] Int. Cl.[7] ........................................ H01S 3/091
[52] U.S. Cl. ...................... 372/75; 372/107; 372/108; 372/9
[58] Field of Search .................... 372/69–72, 75, 372/98, 66, 6, 108, 107, 9

[56] References Cited

U.S. PATENT DOCUMENTS

| | | | |
|---|---|---|---|
| 3,222,615 | 12/1965 | Holly | 372/66 |
| 4,553,238 | 11/1985 | Shaw et al. | 372/6 |
| 4,627,062 | 12/1986 | Bender . | |
| 4,756,002 | 7/1988 | Ruggieri et al. . | |
| 5,048,026 | 9/1991 | Shaw et al. | 372/75 |
| 5,084,886 | 1/1992 | Martin . | |
| 5,140,607 | 8/1992 | Paiva . | |
| 5,307,430 | 4/1994 | Beach et al. . | |
| 5,323,414 | 6/1994 | Baird et al. | 372/70 |
| 5,572,541 | 11/1996 | Suni . | |
| 5,825,803 | 10/1998 | Labranche et al. | 372/75 |
| 5,859,868 | 1/1999 | Kyusho et al. | 372/71 |
| 5,867,324 | 2/1999 | Kmetec et al. | 372/71 |

FOREIGN PATENT DOCUMENTS 07202332  8/1995  Japan .
08316554  11/1996  Japan .

OTHER PUBLICATIONS

Beach et al., "Passively Q–switched transverse–diode–pumped $Nd^{3+}$ : YLF laser oscillator," *Optics Letters*, V17, N2, Jan. 15, 1992, pp. 124–126.

Beach, "Optimization of Quasi–Three Level End–Pumped Q–Switched Lasers," *IEEE Journal of Quantum Electronics*, V31, N9, Sep. 1995, pp. 1606–1613.

Fujikawa et al., "High–Power and High–Efficiency Operation of a CW–Diode–Side–Pumped Nd: YAG Rod Laser," *IEEE Journal of Selected Topics in Quantum Electronics*, V3, N1, Feb. 1997, pp. 40–44.

*Primary Examiner*—Leon Scott, Jr.
*Attorney, Agent, or Firm*—Sughrue, Mion, Zinn, Macpeak & Seas, PLLC

[57] ABSTRACT

A semiconductor excitation solid-state laser apparatus, in which a cross-sectional area of an optical guide plate leading an excited beam emitted from a semiconductor laser element to a solid-state laser medium is made larger in the side of the semiconductor laser element thereof, while a cross-sectional area thereof is made smaller in the side of the solid-state laser medium.

24 Claims, 18 Drawing Sheets

SEMICONDUCTOR EXCITATION SOLID-STATE LASER APPARATUS

FIELD OF THE INVENTION

The present invention relates to a semiconductor excitation solid-state laser apparatus, and more particularly to an optical system in the semiconductor excitation solid-state laser apparatus for propagating (transmitting) an excited beam output from a semiconductor laser to a solid-state laser medium.

BACKGROUND OF THE INVENTION

FIG. 15 and FIG. 16 show semiconductor excitation solid-state laser apparatuses (solid-state laser oscillators) based on the conventional technology respectively. It should be noted that FIG. 16 is a cross-sectional view of the apparatus taking along the line XVI—XVI shown in FIG. 15. The semiconductor excitation solid-state laser apparatus comprises a solid-state laser medium 101, a semiconductor laser 103 as a laser excitation source, and an optical guide plate 105 made with a rectangular solid plate for propagating a beam excited in the semiconductor laser 103 to the solid-state laser medium 101.

An excited beam emitted from the semiconductor laser 103 goes into the optical guide plate 105 with a certain angle of divergence, and reaches the side of the solid-state laser medium 101 being totally reflected on the internal side face of the optical guide plate 105, and is absorbed in the solid-state laser medium 101.

When a semiconductor laser with a large angle of divergence is used, it is required to make larger a thickness (an area of an excited-beam receiving surface) of the optical guide plate 105 so that all the excited beam emitted from the semiconductor laser 103 goes into inside of the optical guide plate 105, but the optical guide plate 105 in the conventional type of semiconductor excitation solid-state laser apparatus is a rectangular solid plate in its shape, so that an area of the beam outgoing surface of the optical guide plate 105 in the side of the solid-state laser medium 101 becomes also larger according to a larger area of the excited-beam receiving surface of the optical guide plate 105, whereby the excited beam is not absorbed in the solid-state laser medium 101, so that a proportion as a loss due to the excited beam going back along inside the optical guide plate 105 becomes larger.

To efficiently transmit a beam, it is required to third-dimensionally set positions of a semiconductor laser chip incorporated in the semiconductor laser 103 as well as of the optical guide plate 105 with a precision at a specified level or more. FIG. 17 shows an influence of a vertical error (displacement of an optical axis) between the semiconductor laser chip and the optical guide plate onto a coupling loss. The x-axis indicates a proportion of a vertical error to the thickness of the optical guide plate. The coupling-loss curve shown in FIG. 17 is different depending on a divergence angle of an outgoing beam from the semiconductor laser chip as well as on a material of the optical guide plate. This example shows the fact that, when the vertical error exceeds 30%, a coupling loss abruptly increases.

FIG. 18 shows an influence of a gap in the direction of the optical axis between the semiconductor laser chip incorporated in the semiconductor laser and the optical guide plate onto a coupling loss. The coupling-loss curve in this case is also different depending on a divergence angle of an outgoing beam from the semiconductor laser chip as well as on a material of the optical guide plate 105. This example shows the fact that, when the gap error exceeds 25%, a coupling loss gradually increases.

SUMMARY OF THE INVENTION

It is an object of the present invention to obtain a semiconductor excitation solid-state laser apparatus having an optical system improved so that an excited beam outputted from the semiconductor laser is efficiently propagated to a solid-state laser medium and the solid-state laser medium can efficiently absorb the excited beam by reducing a loss due to the excited beam from the semiconductor laser going back along inside the optical guide plate as well as a coupling loss of the beam.

In the semiconductor excitation solid-state laser apparatus according to the present invention, a cross-sectional area of the optical guide plate is larger in the side of the semiconductor laser thereof and is getting smaller from the semiconductor laser side toward the side of the solid-state laser medium, so that a large quantity of excited beam from the semiconductor laser is fetched into the optical guide plate, whereby a quantity of the excited beam going back to the optical guide plate from the solid-state laser medium is reduced.

In the semiconductor excitation solid-state laser apparatus according to the present invention, the cross-sectional area of the optical guide plate is larger in the side of the semiconductor laser thereof and is getting smaller from the semiconductor laser side toward the side of the solid-state laser medium according to change in thickness of the plate, so that a large quantity of excited beam from the semiconductor laser is fetched into the optical guide plate, whereby a quantity of the excited beam going back to the optical guide plate from the solid-state laser medium is reduced.

In the semiconductor excitation solid-state laser apparatus according to the present invention, a form of a beam receiving surface of the optical guide plate has a concave form or a convex form according to a refractive index $n_g$ of the optical guide plate.

In the semiconductor excitation solid-state laser apparatus according to the present invention, all the excited beam outputted from the optical guide plate is absorbed in the solid-state laser medium without leaking any portion thereof from a converging device to the outside thereof.

In the semiconductor excitation solid-state laser apparatus according to the present invention, all the beam excited in the semiconductor laser is directly introduced into the optical guide plate and the excited beam from the optical guide plate is absorbed in the whole area of the length of the solid-state laser medium.

In the semiconductor excitation solid-state laser apparatus according to the present invention, the excited beam having entered inside of the optical guide plate is totally reflected therein, so that any beam is not leaked from the side face thereof or the like to the outside thereof.

In the semiconductor excitation solid-state laser apparatus according to the present invention, uniformity of an excited beam in the axial direction is improved by an optical diffusion plate.

In the semiconductor excitation solid-state laser apparatus according to the present invention, a height spacer for adjusting displacement of an optical axis is specified so that a displacement rate of the optical axis between the semiconductor laser chip that the semiconductor laser has and the optical guide plate will be within the specified error limits, and a gap spacer for adjusting a gap is specified so that a gap in the direction of the optical axis therebetween will be within a specified range of allowable error, whereby the displacement rate of the optical axis therebetween as well as the gap in the direction of the optical axis therebetween will be within the range of allowable error.

In the semiconductor excitation solid-state laser apparatus according to the present invention, the height spacer is provided in a space between a bottom section of the main body of the package and the holding member of the optical guide plate, so that a displacement rate of the optical axis between the semiconductor laser chip and the optical guide plate will be within a range of allowable error, and the gap spacer is provided in a space between the front section of the main body of the package and the holding member of the optical guide plate, so that a gap in the direction of the optical axis between the semiconductor laser chip and the optical guide plate will be within the range of allowable error.

In the semiconductor excitation solid-state laser apparatus according to the present invention, the optical guide plate is supported by a gap spacer, and when the gap spacer is pushed onto a main body of the package for the semiconductor laser to adjust the gap, the gap in the direction of the optical axis between the semiconductor laser chip and the optical guide plate will be within a range of allowable error, and the height spacer is provided in a space between the gap spacer and the holding member for the optical guide plate, so that the displacement rate of the optical axis between the semiconductor laser chip and the optical guide plate will be within a range of allowable error.

In the semiconductor excitation solid-state laser apparatus according to the present invention, a submount is positioned and arranged on a submount positional arrangement section and an optical guide plate is positioned and arranged on the positional arrangement section for the optical guide plate, and with both of the positional arrangement, the displacement rate of the optical axis between the semiconductor laser chip and the optical guide plate will be within a range of allowable error and the gap in the direction of the optical axis therebetween will be within the range of allowable error.

In the semiconductor excitation solid-state laser apparatus according to the present invention, a submount is positioned and arranged on the submount positional arrangement section provided by a step section obtained by means of machining the main body of the package, an optical guide plate is positioned and arranged on the positional arrangement section for the optical guide plate provided by a step section obtained thereby, and with both of the positional arrangement, the displacement rate of the optical axis between the semiconductor laser chip and the optical guide plate will be within a range of allowable error and the gap in the direction of the optical axis therebetween will be within the range of allowable error.

In the semiconductor excitation solid-state laser apparatus according to the present invention, the optical guide plate is sandwiched and held between the main body of the package and a package cover, whereby a holding strength of the optical guide plate is enhanced.

In the semiconductor excitation solid-state laser apparatus according to the present invention, the optical guide plate with a packing agent or an adhesive agent is sandwiched and held between the main body of the package and the package cover, so that the packing agent or adhesive agent can act as a cushion material to prevent a breakage of the optical guide plate due to an excessive sandwiching force.

In the semiconductor excitation solid-state laser apparatus according to the present invention, a refractive index of the packing agent or the adhesive agent is smaller than that of the optical guide plate, and with this optical feature, an optical leakage loss of a light beam from the side face section of the optical guide plate is suppressed.

Other objects and features of this invention will become understood from the following description with reference to the accompanying drawings.

DESCRIPTION OF THE PREFERRED EMBODIMENTS

Figure 1:
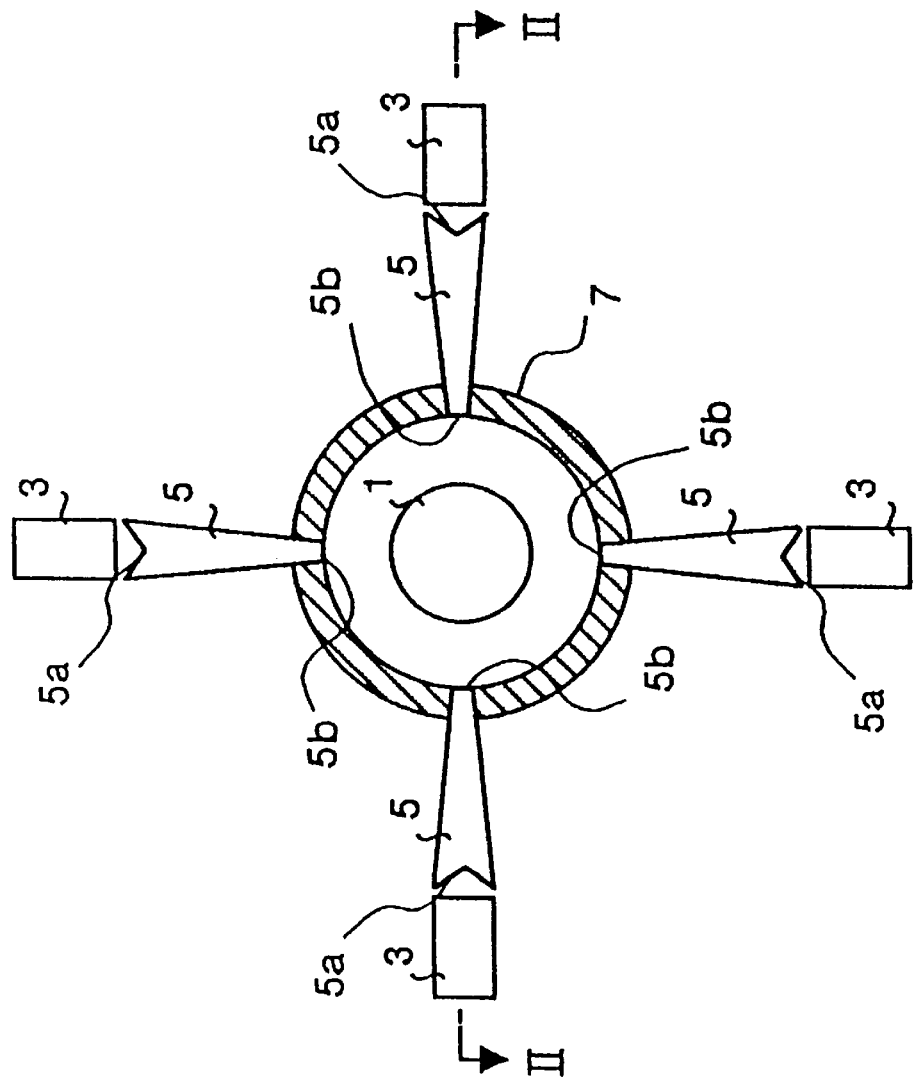
FIG. 1 is a front view showing a semiconductor excitation solid-state laser apparatus according to Embodiment 1 of the present invention.

Detailed description is made for embodiments of the semiconductor excitation solid-state laser apparatus according to the present invention with reference to the related drawings.

FIG. 1 to FIG. 4 show a semiconductor excitation solid-state laser apparatus according to Embodiment 1 of the present invention respectively.

This semiconductor excitation solid-state laser apparatus comprises a cylindrical solid-state laser medium 1 made with a YAG rod or the like, a plate-formed semiconductor laser (semiconductor laser package) 3 made with a laser diode as a laser excitation source, an optical guide plate (optical transmission body) 5 made of optical glass for propagating a beam excited in the semiconductor laser 3 to the solid-state laser medium 1, and a converging device 7 made with a cylindrical reflecting mirror for reflecting the excited beam outputted from the optical guide plate 5 to the solid-state laser medium 1.

The solid-state laser medium 1 is concentrically arranged at the central position inside of the converging device 7. In this embodiment, there are four units of semiconductor laser 3 and also four sheets of optical guide plate 5 each for the respective the semiconductor lasers 3, which are radially spaced uniformly each with an angle of rotation of 90 degrees around the central axis of the solid-state laser medium 1.

The optical guide plate 5 has the largest thickness in the beam receiving surface 5a in the side of the semiconductor laser 3 thereof, is getting smaller from the beam receiving surface toward the side of the solid-state laser medium 1, and has the minimum thickness in the beam outgoing surface 5b thereof. With this feature, a cross-sectional area crossing at right angles a main optical axis A (Refer to FIG. 3, FIG. 4) for propagation of an excited beam outputted from the semiconductor laser 3 is larger in the side of the semiconductor laser thereof and is getting smaller from the side of the semiconductor laser toward the side of the solid-state laser medium 1.

Figure 2:
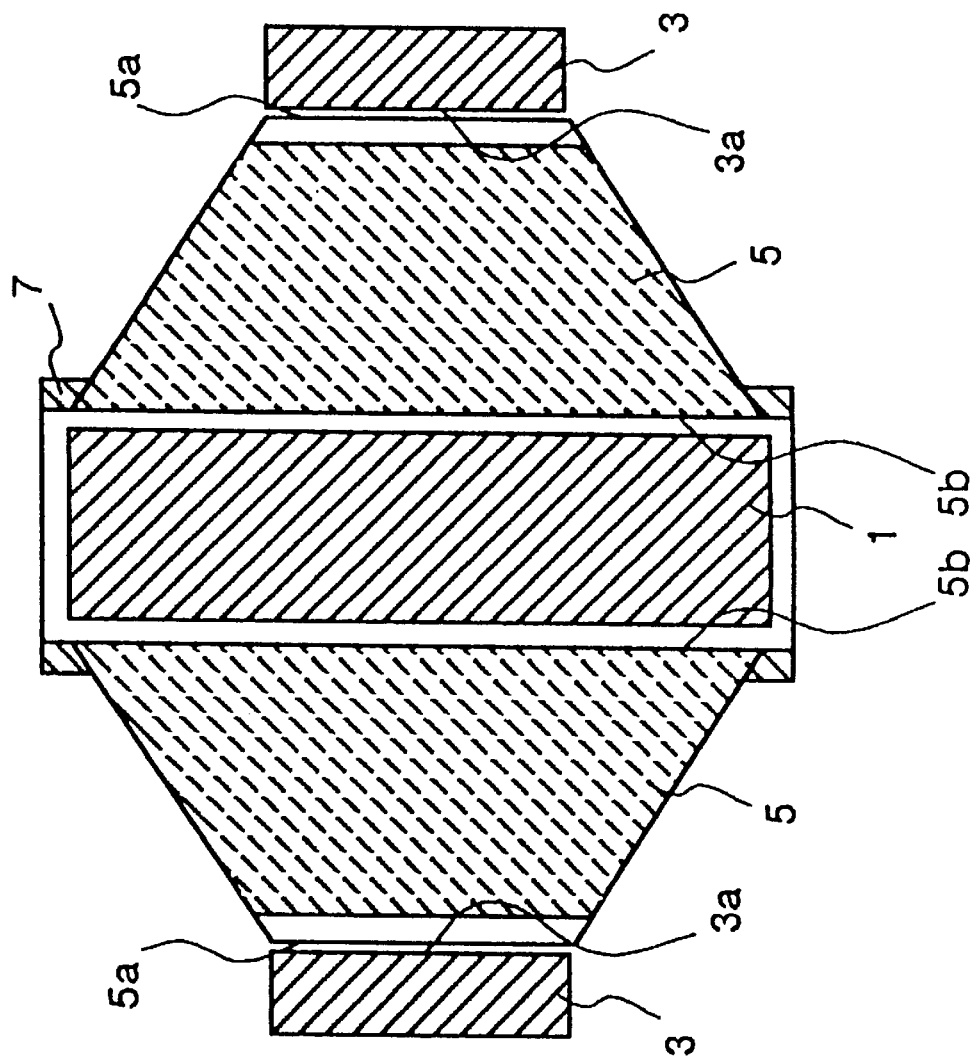
FIG. 2 is a cross-sectional view of the above apparatus taken along the line II—II shown in FIG. 1.

The optical guide plate 5 has, as shown in FIG. 2 (FIG. 2 is a cross-sectional view of the apparatus taken along the line II—II shown in FIG. 1), a length thereof in the side of the semiconductor laser 3 which is substantially equal to a length of a slit of a slit-formed beam emitting section 3a in the semiconductor laser 3 and a length thereof in the side of the solid-state laser medium 1 which is substantially equal to the length of the solid-state laser medium 1 (a length of the axis), which gives a trapezoid to a plane figure thereof.

With this feature, all the beam excited in the semiconductor laser 3 is directly introduced in the optical guide plate 5 and the excited beam is absorbed from the optical guide plate 5 into the solid-state laser medium 1 through over the whole length thereof.

Also in this case, by adjusting the thickness of the optical guide plate 5, it is possible to maximize an area of the beam receiving surface 5a in the side of the semiconductor laser 3 as well as to minimize that of the beam outgoing surface 5b.

The converging device 7 is a device for reflecting an excited beam outgoing from the optical guide plate 5 to the solid-state laser medium 1, and the entire periphery of the solid-state laser medium 1 is surrounded by this converging device 7 as well as by the optical guide plate 5 without any space left therein.

With this feature, all the excited beam outgoing therefrom is absorbed in the solid-state laser medium 1 without leaking any portion thereof from the converging device 7 to the outside thereof.

An excited beam emitted from the slit-formed beam emitting section 3a of the semiconductor laser 3 goes into the optical guide plate 5 through the beam receiving surface 5a with a certain divergence (angle of divergence). The maximum divergence angle (described as a critical angle hereinafter) θ at which an excited beam can be propagated repeating its multireflection on both side faces 5c of the optical guide plate 5 is obtained through the expression (3) assuming that a refractive index of the optical guide plate 5 is $n_g$.

$$\theta = \arcsin [n_g \cdot \sin \{\arccos \cdot (1/n_g) - \alpha - \beta\}] + \alpha \quad (3)$$

Herein α indicates inclination from a vertical surface against a reference surface of the optical guide plate 5 between the slit-formed beam emitting section 3a of the semiconductor laser 3 and the center of the solid-state laser medium 1 at the excited beam receiving point, and β indicates inclination of side faces 5c of the optical guide plate 5 against the direction of the main optical axis for propagation of the excited beam.

In an area where the inclination β is a positive value, a cross-sectional area of the optical guide plate 5 in the side of the semiconductor laser 3 is larger than a cross-sectional area thereof in the side of the solid-state laser medium 1, so that a quantity of the excited beam going back from the side of the converging device 7 can be reduced as compared to a case where an optical guide plate in the shape of a rectangular solid plate is used.

The critical angle θ takes a maximum value of π/2+α when the inclination α of the beam-receiving surface 5a and the inclination β of the inclination side face 5c satisfy the next expression (4).

$$\alpha + \beta = \arccos (1/n_g) - \arcsin (1/n_g) \quad (4)$$

Figure 3:
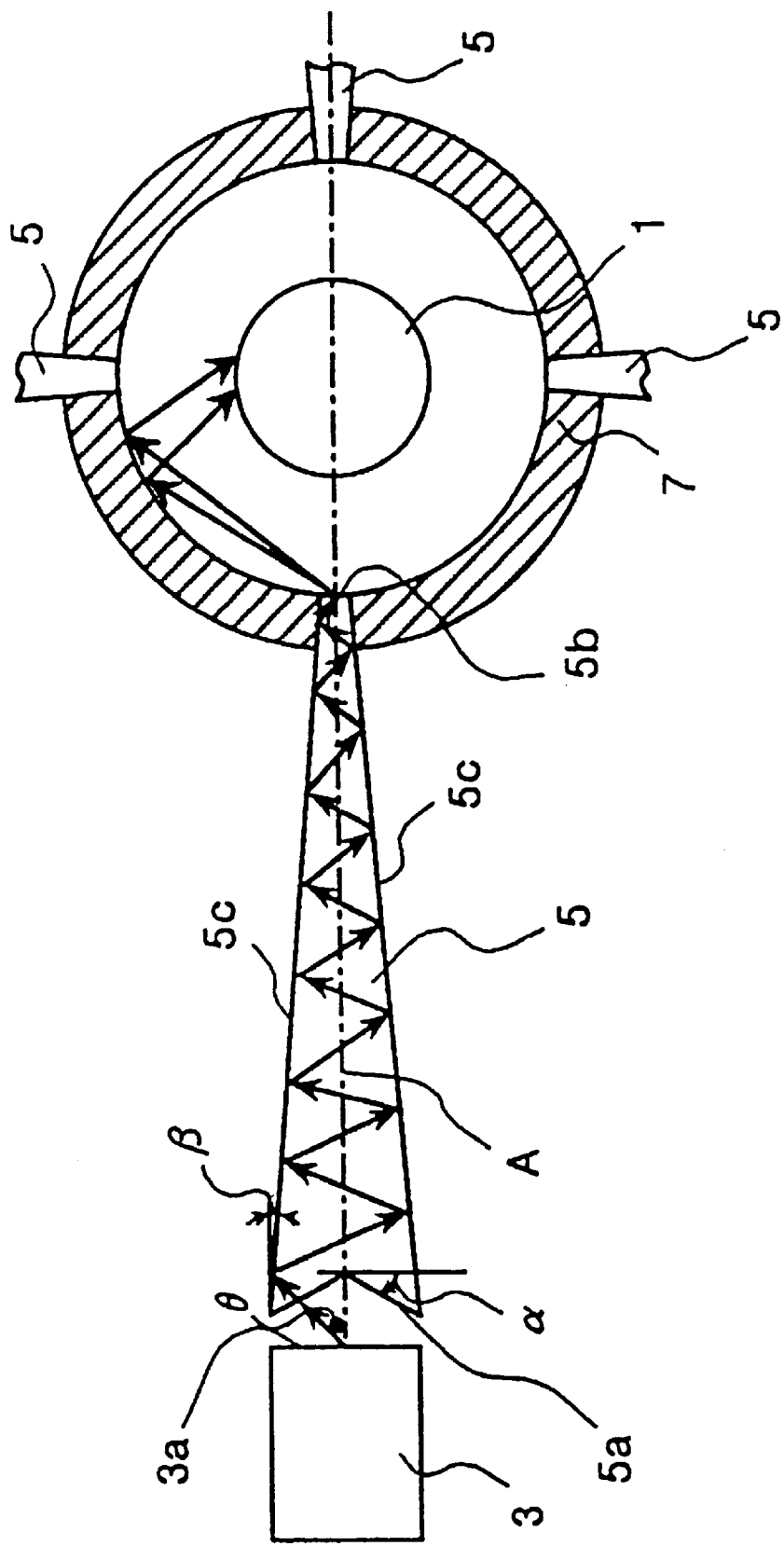
FIG. 3 is a front view showing a case where a beam receiving surface has a concave form in the semiconductor excitation solid-state laser apparatus according to Embodiment 1 of the present invention.
Figure 4:
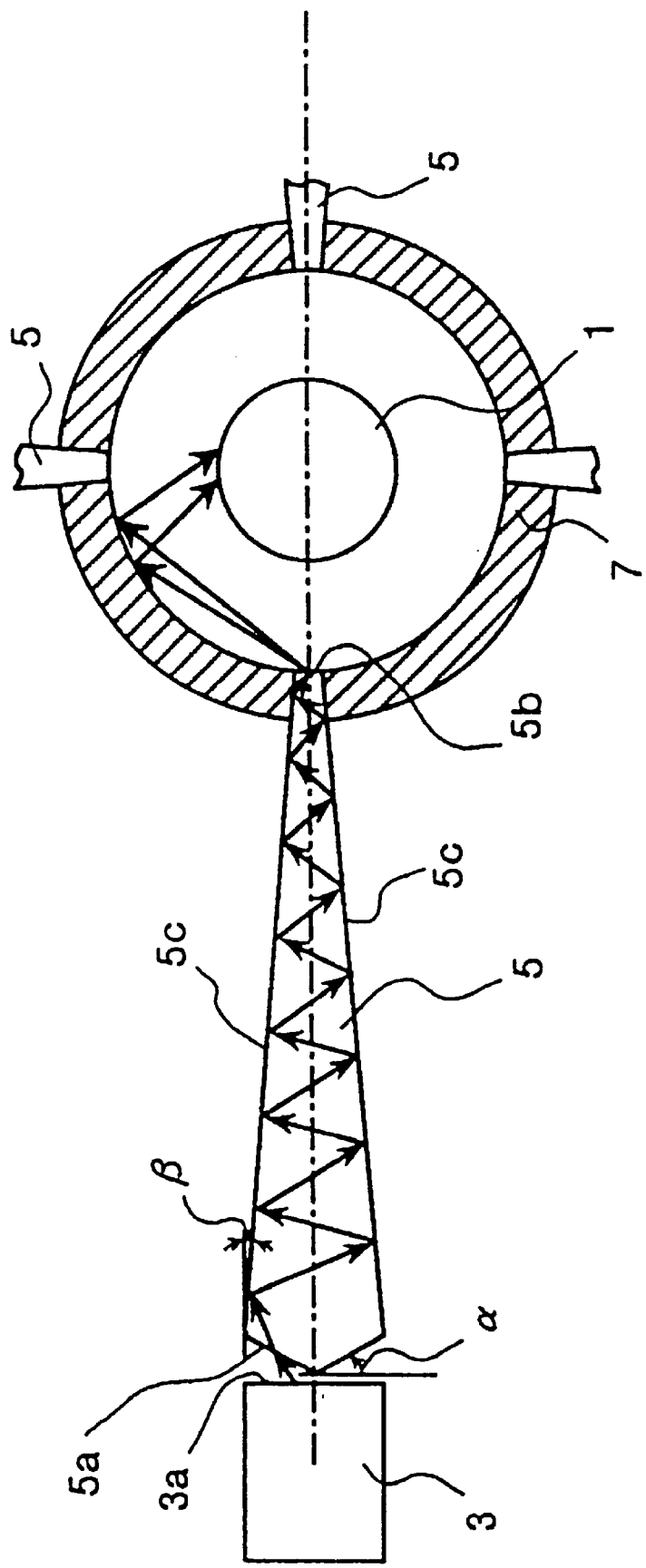
FIG. 4 is a front view showing a case where a beam receiving surface has a convex form in the semiconductor excitation solid-state laser apparatus according to Embodiment 1 of the present invention.

The form of the beam-receiving surface of the optical guide plate 5 giving the maximum critical angle is a concave form, as shown in FIG. 3, if the inclination α is a positive value, while, if the inclination α is a negative value, as shown in FIG. 4, it is a convex form. Accordingly, the form of a beam receiving surface is decided depending on the sign of a value in the expression (5).

$$\arccos (1/n_g) - \arcsin (1/n_g) - \beta \quad (5)$$

The form of the beam-receiving surface of the optical guide plate 5 giving the maximum critical angle is a convex form as shown in FIG. 4 because the inclination α is a negative value if the refractive index $n_g$ of the optical guide plate 5 is $\sqrt{2}$ or less when the inclination β of side face 5c is 0. In contrast, if the refractive index $n_g$ thereof is $\sqrt{2}$ or more, the inclination α is a positive value, so that the form of the beam-receiving surface is a concave form as shown in FIG. 3.

In the optical guide plate 5, if an area for receiving an excited beam from the semiconductor laser 3 is made larger and also a cross-sectional area thereof in the side of semiconductor laser 3 is made larger than that in the side of the solid-state laser medium 1 in order to reduce a quantity of beam reflected from the converging device 7 which reversely enters the optical guide plate 5, the inclination β becomes a positive value.

In this case, the refractive index $n_g$ as a critical value at which a form of the beam-receiving surface of the optical guide plate 5 becomes is a concave form or a convex form, is a value larger than $\sqrt{2}$. This fact indicates that the maximum critical angle π/2+α can be made larger by using the optical guide plate 5 with a larger refractive index $n_g$, and that a ratio between the cross-sectional areas of the optical guide plate 5 in the side of the semiconductor laser 3 and that in the solid-state laser medium 1 can also be made larger.

By selecting a combination of the inclination α and inclination β which satisfy the expression (4) for the optical guide plate 5, the angle of divergence of an excited beam from the semiconductor laser 3 which can be fetched into the optical guide plate 5 and propagated to the solid-state laser medium 1 becomes a maximum value of π/2+α. Namely, if the angle of divergence of the semiconductor laser 3 is θ, the inclination β of side face 5c of the optical guide plate 5 can be obtained, as far as the angle satisfies the next expression (6), through the expression (4).

$$\beta \leq \theta - [(\pi/2)\{\text{arc cos } (1/n_g) - \text{arc sin } (1/n_g)\}] \quad (6)$$

In a case where a substance of the side face of the optical guide plate 5 is not air but any substance with a refractive index $n_a$, the conditions that the expression (4) and the expression (6) satisfy are corrected to those as expressed by the next expressions (7), and (8).

$$\alpha + \beta = \text{arc cos } (n_a/n_g) - \text{arc sin } (1/n_g) \quad (7)$$

$$\beta \leq \theta - [(\pi/2)\{\text{arc cos } (n_a/n_g) - \text{arc sin } (1/n_g)\}] \quad (8)$$

With the configuration described above, a large quantity of excited beam from the semiconductor laser 3 can be directed into the optical guide plate 5, the directed beam can be propagated to the solid-state laser medium 1, and further a quantity of the beam coming back from the converging device 7 can be reduced, whereby it is possible to realize a semiconductor excitation solid-state laser apparatus which can efficiently propagate an output from a semiconductor laser to a solid-state laser medium.

Figure 5:
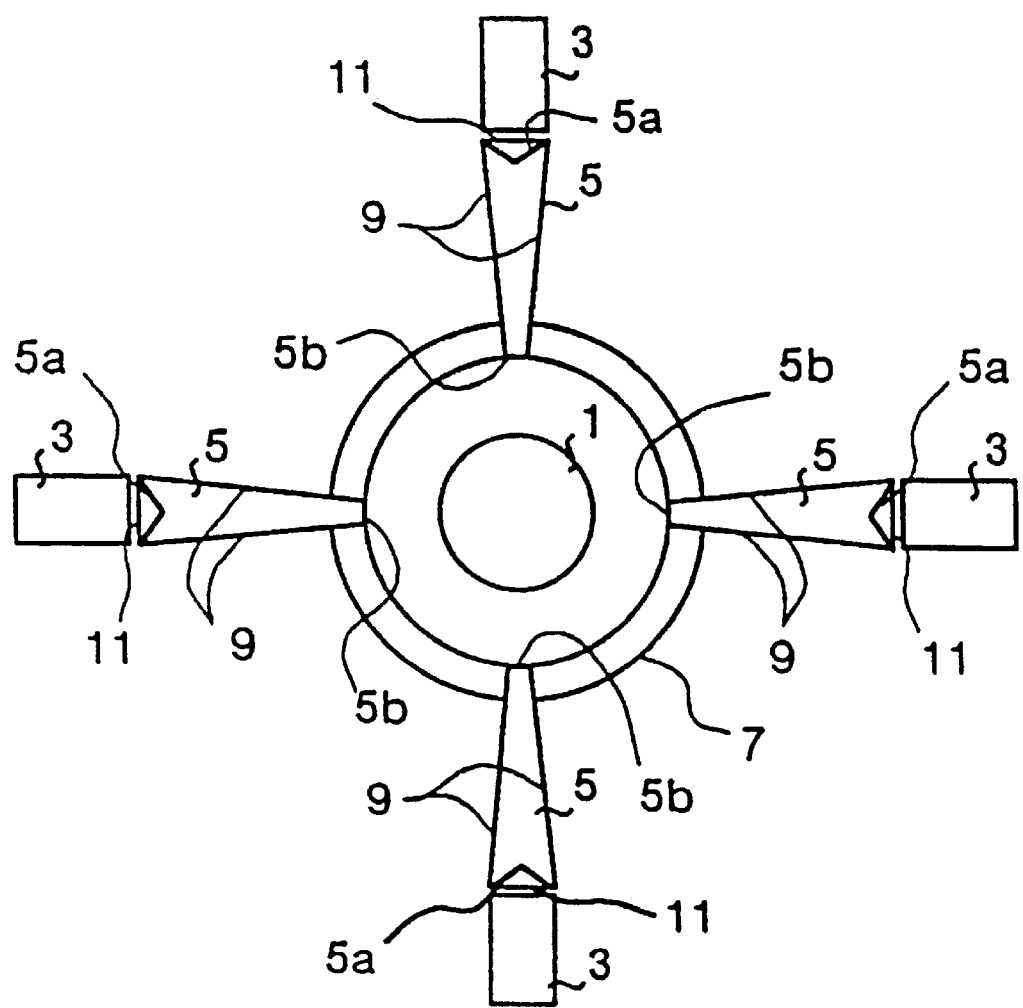
FIG. 5 is a front view showing a semiconductor excitation solid-state laser apparatus according to Embodiment 2 of the present invention.

FIG. 5 shows a semiconductor excitation solid-state laser apparatus according to Embodiment 2 of the present invention. It should be noted that, in FIG. 5, the same reference numerals are assigned to the sections corresponding to those in FIG. 1, and description thereof is omitted herein.

In this embodiment, a total-reflection coating layer 9 for totally reflecting the semiconductor laser with any waveform is applied on the external surface excluding the edge surfaces of the optical guide plate 5 in the side of the semiconductor laser 3 as well as in the side of the solid-state laser medium 1 (beam receiving surface 5a, beam outgoing surface 5b).

With this coating, an excited beam having entered inside of the optical guide plate 5 does not leak from the side face 5c or the like to the outside thereof, so that an excited beam from the semiconductor laser 3 can be propagated to the solid-state laser medium 1 with only a low loss, whereby it is possible to realize a semiconductor excitation solid-state laser apparatus which can efficiently propagate an output from a semiconductor laser to a solid-state laser medium.

A beam diffusion plate 11 is also arranged in a space between the semiconductor laser 3 and the optical guide plate 5 to uniform-an excited beam in the axial direction.

Also with the feature described above, a large quantity of excited beam from the semiconductor laser 3 can be directed into the optical guide plate 5, the directed beam can be propagated to the solid-state laser medium 1, and further a quantity of the beam coming back from the converging device 7 can be reduced, whereby it is possible to realize a semiconductor excitation solid-state laser apparatus which can efficiently propagate an output from a semiconductor laser to a solid-state laser medium.

Figure 6:
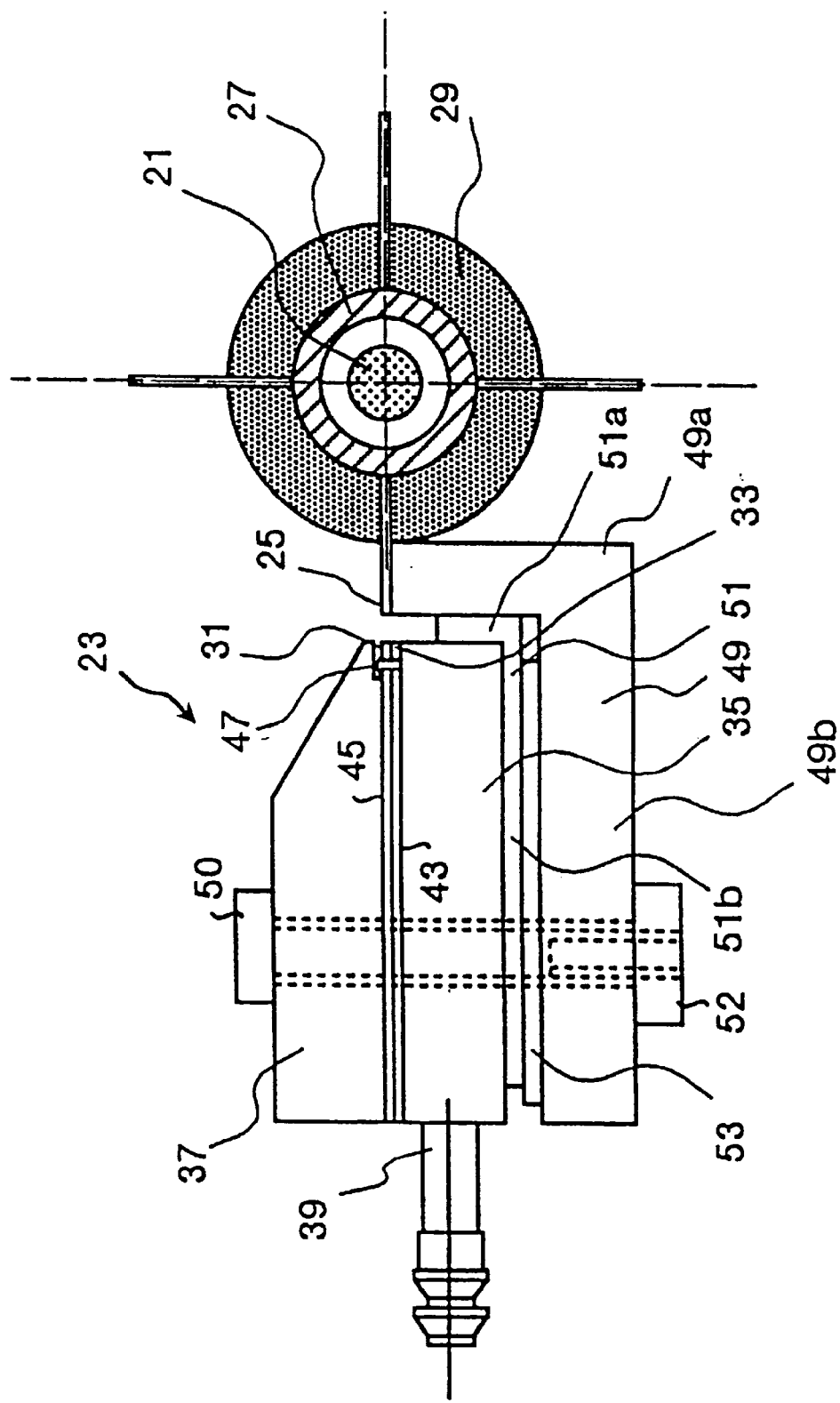
FIG. 6 is a front view showing the semiconductor excitation solid-state laser apparatus according to Embodiment 3 of the present invention.
Figure 7:
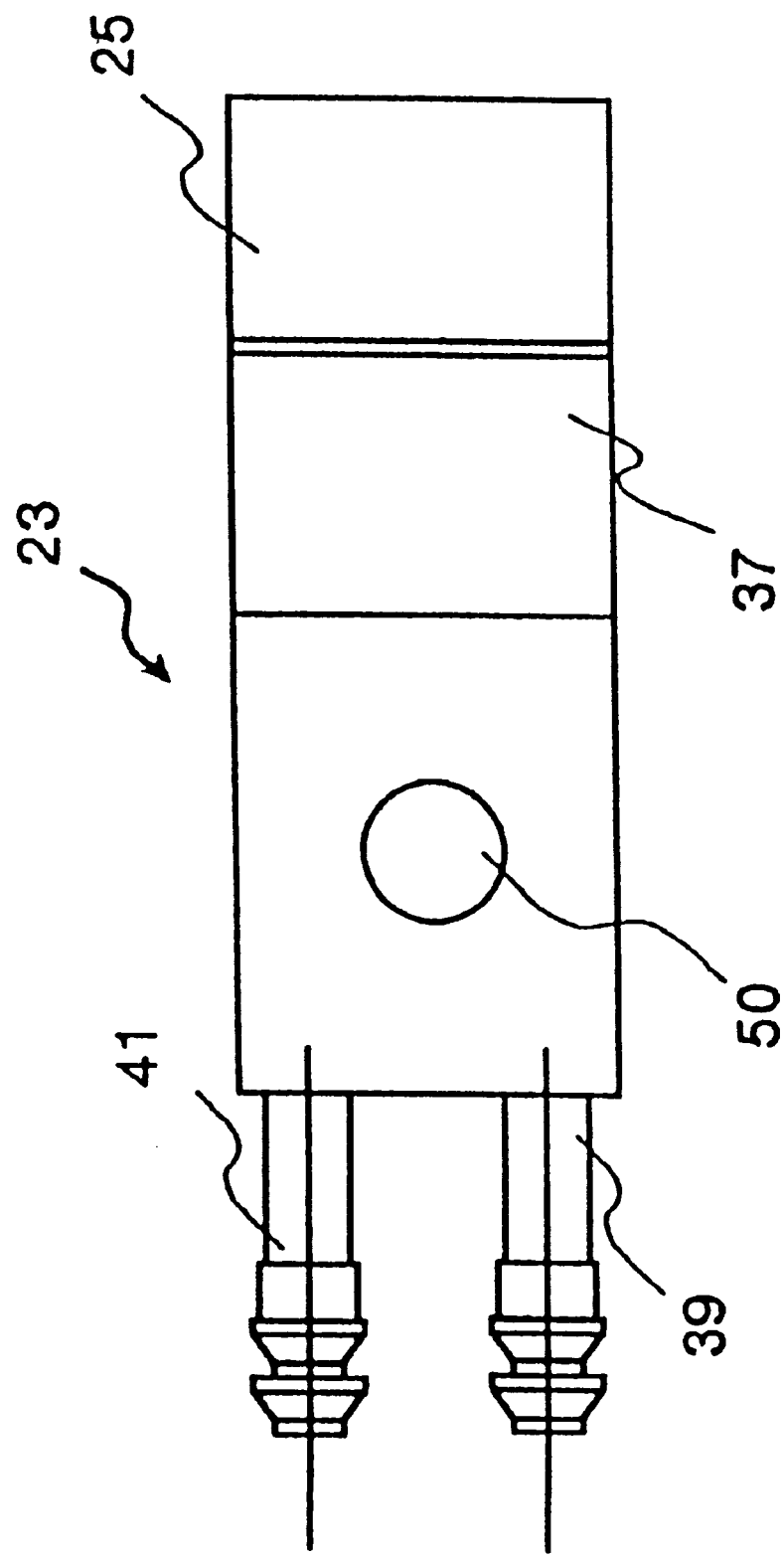
FIG. 7 is a plan view showing the semiconductor excitation solid-state laser apparatus according to Embodiment 3 of the present invention.

FIG. 6 and FIG. 7 show a semiconductor excitation solid-state laser apparatus according to Embodiment 3 of the present invention respectively.

This semiconductor excitation solid-state laser apparatus comprises a cylindrical solid-state laser medium 21 made with a YAG rod or the like, a plate-formed semiconductor laser (semiconductor laser package) 23 made with a laser diode or the like as a laser excitation source, an optical guide plate (optical transmission body) 25 made of optical glass for propagating an excited beam from the semiconductor laser 23 to the solid-state laser medium 21, a flow tube 27 made from transparent glass and arranged concentrically at the position of the solid-state laser medium 21 to cool down the solid-state laser medium 21, and a converging device 29 by a tubular reflecting mirror for reflecting an excited beam outputted from the optical guide plate 25 onto the solid-state laser medium 21.

The solid-state laser medium 21 is concentrically arranged at the central position inside of the converging device 29, and in this embodiment, there are also four units of semiconductor laser 23 and also four units of optical guide plate 25 each for the respective semiconductor lasers 23, which are radially positioned at an equal space from each other by 90 degrees around the central axis of the solid-state laser medium 21. It should be noted that, although only one unit of semiconductor laser 23 corresponding to one of the optical guide plates 25 is shown in FIG. 6, naturally, the semiconductor laser is attached to each of other three units of optical guide plate 25 as described above. Also, arrangement of a plurality units of semiconductor laser in the longitudinal direction (in the axial direction of the rod-formed solid-state laser medium 21) to one unit of solid-state laser medium 21 can work for the purpose of increasing a laser output.

The semiconductor laser 23 has a package structure comprising a semiconductor laser chip 31 for emitting a laser beam, a submount 33 with the semiconductor laser chip 31 mounted on the top surface thereof for removing a heat (heat sink) due to the operation by the semiconductor laser chip 31 and absorbing a difference of coefficient of linear expansion between the semiconductor laser chip 31 and the main body of a package 35 described later, the main body of the package 35 in a water jacket structure with the submount 33 mounted on the top surface thereof having a cooling water path (not shown in the figure) inside the jacket to discharge a heat from the submount 33 to the outside thereof, and a package cover 37 attached to the main body of the package 35 to protect the semiconductor laser chip 31. It should be noted that a cooling water inlet pipe 39 and a cooling water outlet pipe 41 are mounted on the rear surface section of the main body of the package 35.

The semiconductor laser chip 31 and the submount 33 are connected to each other by metal soldering so that sufficient heat conduction and electric conduction are insured therebetween, and the submount 33 is connected to the main body of the package 35 made of conductive material by metal soldering so that sufficient heat conduction and electric conduction are insured therebetween, in which the main body of the package 35 works also as an anode electrode.

Provided on the top surface of the main body of the package 35 is an electrode member 45 with an electrical insulating plate 43. The electrode member 45 is electrically connected to the semiconductor laser chip 31 through a plurality of fine metal wire 47, and contacts the package cover 37 made of conductive material in the surfaces, whereby the package cover 37 works also as a cathode electrode.

In the electrode structure as described above, a laser beam for excitation is oscillated from the right edge of the semiconductor laser chip 31 by loading a voltage on a point between the main body of the package 35 and the package cover 37.

The optical guide plate 25 is fixed to the top surface of a front erect section 49a of a reversed-L-shaped holding member 49 for the guide plate. The guide plate holding member 49, main body of the package 35, and package cover 37 are firmly fixed and connected to each other by a fastening bolt 50 penetrating those components as well as a nut 52 screwed to the fastening bolt 50.

A laser beam oscillated from the semiconductor laser chip 31 is introduced into the very thin optical guide plate 25 with a low optical loss. It should be noted that I/O edges of the optical guide plate 25 to an excited laser beam are quite larger in each area as compared to that of an optical fiber, and for this reason, non-reflection coating can be performed to those edges, whereby it is possible to suppress optical losses in both of the edges to 1% or less.

Herein, to efficiently transmit a beam from the semiconductor laser chip 31 to the optical guide plate 25 through the optical coupling therebetween, it is required, as described above, to three-dimensionally and relatively set each position of the semiconductor laser chip 31 as well as of the optical guide plate 25 with precision at a specified level or more.

In the assembly structure as described above, setting of a relative position between the semiconductor laser chip 31 and the optical guide plate 25 is decided depending on a relative position between the guide plate holding member 49 and the main body of the package 35.

Provided in a space between the main body of the package 35 and the guide plate holding member 49 are an L-shaped gap spacer 51 and a plate-shaped height spacer 53. Those spacers 51, 53 are fastened together with the package cover 37, main body of the package 35, and guide plate holding member 49 by the fastening bolt 50 and the nut 52.

The L-shaped gap spacer 51 has a gap adjusting section 51a provided between the front section of the main body of the package 35 and the front-section erect section 49a of the guide plate holding member 49, and a gap in the direction of the optical axis between the semiconductor laser chip 31 and the optical guide plate 25 is set according to a thickness of the gap adjusting section 51a.

A horizontal section 51b of the L-shaped gap spacer 51 and the height spacer 53 are superimposed on each other and are provided between the bottom section of the main body of the package 35 and a horizontal section 49b of the guide plate holding member 49, so that vertically relative positions of the semiconductor laser chip 31 and the optical guide plate 25 are decided according to a total thickness of the horizontal section 51b of the L-shaped gap spacer 51 and the height spacer 53.

With this feature, the height spacer 53 and the horizontal section 51b of the L-shaped gap spacer 51 are adjusted so that a displacement rate in the optical axis between the semiconductor laser chip 31 and the optical guide plate 25 will be within a range of allowable range, and the L-shaped gap spacer 51 is adjusted so that a gap in the direction of the optical axis between the semiconductor laser chip 31 and the optical guide plate 25 will be within the range of allowable error, whereby both of the displacement rate in the optical axis therebetween and the gap in the direction of the optical axis therebetween are within the range of allowable error.

With this feature, a coupling loss due to an error in the displacement in the optical axis as well as to a gap error can be suppressed to a small value and optical transmission from the semiconductor laser chip 31 to the optical guide plate 25 is efficiently performed, whereby it is possible to efficiently propagate an output from a semiconductor laser to a solid-state laser medium.

Figure 8:
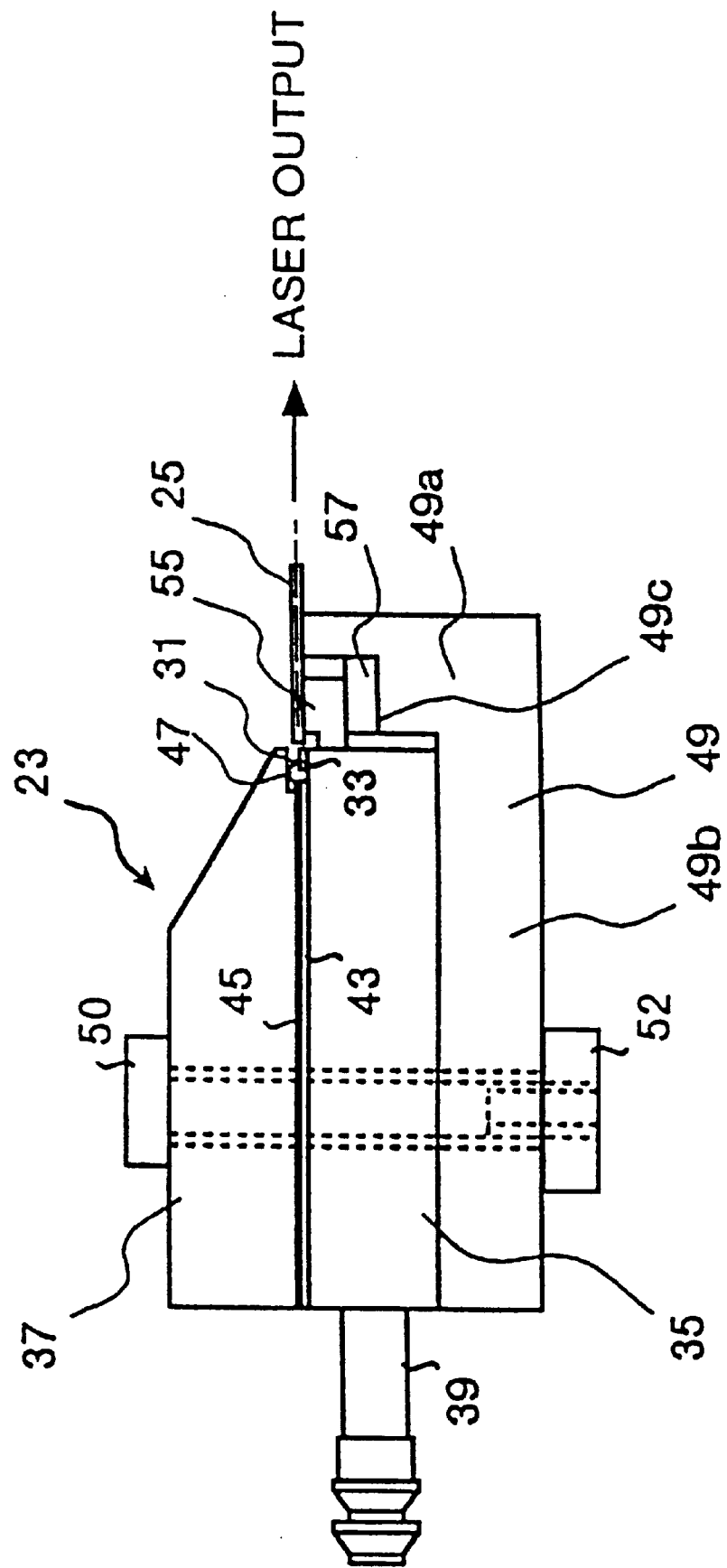
FIG. 8 is a front view showing a semiconductor excitation solid-state laser apparatus according to Embodiment 4 of the present invention.

FIG. 5 shows a semiconductor excitation solid-state laser apparatus according to Embodiment 4 of the present invention. It should be noted that, in FIG. 8, the same reference numerals are assigned to the sections corresponding to those in FIG. 6, and description thereof is omitted herein.

In this embodiment, the optical guide plate 25 is fixed onto a gap spacer 55, and a gap in the direction of the optical axis between the semiconductor laser chip 31 and the optical guide plate 25 is set by the gap spacer 55 by pushing the gap spacer 55 onto the front surface of the main body of the package 35.

A height spacer 57 is provided in a space between the gap spacer 55 and a step section 49c with a spacer placed thereon formed on the front-section erect section 49a of the guide plate holding member 49. With this configuration, vertically relative positions of the semiconductor laser chip 31 and the optical guide plate 25 are decided according to a total thickness of the gap spacer 55 and the height spacer 57, whereby displacement in the optical axis can be adjusted.

In the embodiment, the optical guide plate 25 is connected by a dedicated connector so that the gap spacer 55 can be connected thereto with a specified gap with a surface of the gap spacer 55 contacting the main body of the package 35 as a reference, and then the height spacer 57 for vertical adjustment is adjusted, whereby both of the displacement rate in the optical axis between the semiconductor laser chip 31 and the optical guide plate 25 and the gap in the direction of the optical axis therebetween are within a range of allowable error.

With this feature, a coupling loss due to an error in the displacement in the optical axis as well as to a gap error can be suppressed to a small value and optical transmission from the semiconductor laser chip 31 to the optical guide plate 25 is efficiently performed, whereby it is possible to efficiently propagate an output from a semiconductor laser to a solid-state laser medium.

Figure 9:
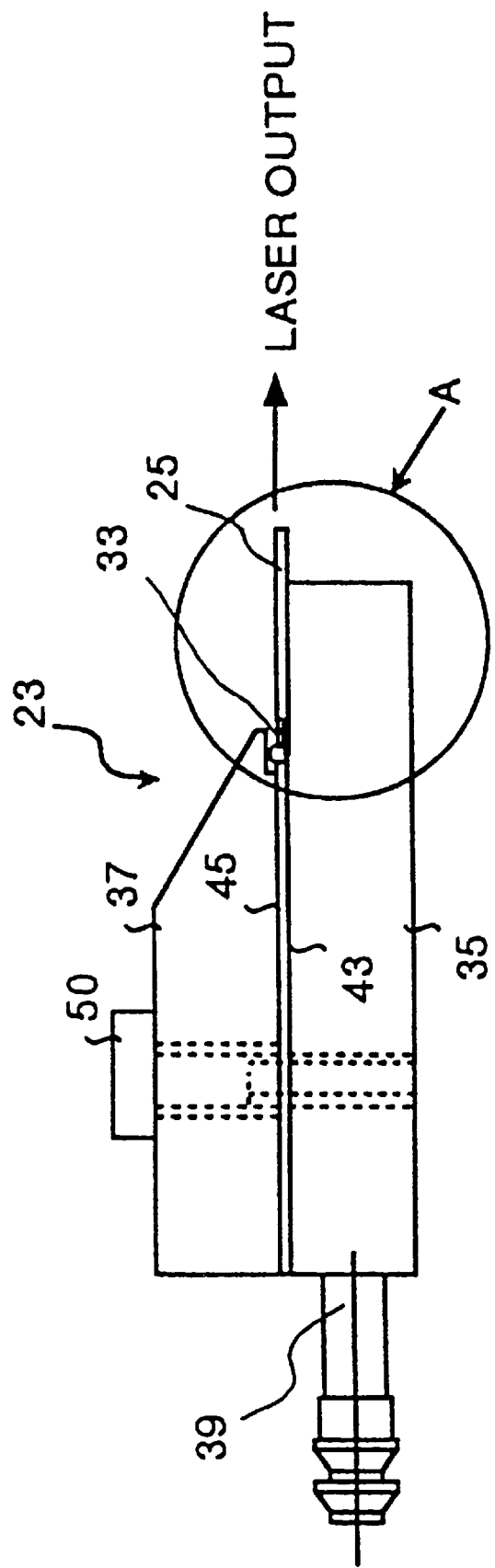
FIG. 9 is a front view showing the semiconductor excitation solid-state laser apparatus according to Embodiment 5 of the present invention.
Figure 10:
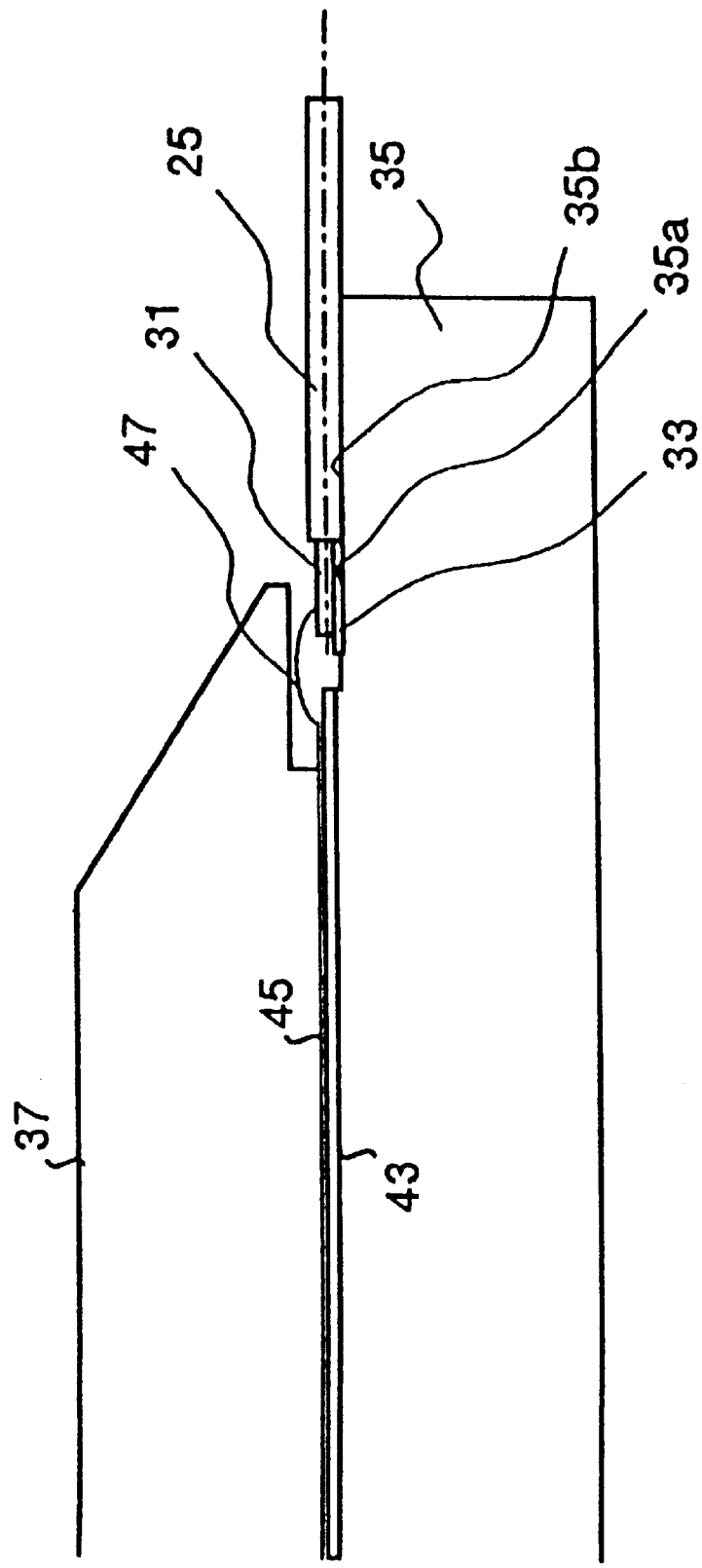
FIG. 10 is an enlarged view of the area A shown in FIG. 9.

FIG. 9 and FIG. 10 show a semiconductor excitation solid-state laser apparatus according to Embodiment 5 of the present invention respectively. It should be noted that, in FIG. 9, FIG. 10, the same reference numerals are assigned to the sections corresponding to those in FIG. 6, and description thereof is omitted herein.

In this embodiment, the submount 33 with the semiconductor laser chip 31 mounted thereon and the optical guide plate 25 are linearly arranged in the direction of the optical axis on the main body of the package 35.

A first step section 35a as a positional arrangement section for the submount 33 and a second step section 35b as a positional arrangement section for the optical guide plate 25 are provided on the main body of the package 35 by subjecting machining thereto.

The first step section 35a and the second step section 35b are obtained by being machined with high precision so that a laser beam for excitation from the semiconductor laser chip 31 passes through the center of the optical guide plate 25 and in addition a gap in the direction of the optical axis between the semiconductor laser chip 31 and the optical guide plate 25 will be within a specified range of allowable error.

With this feature, the submount is soldered and connected to the first step section 35a with solder's thickness of several microns in a state where the submount is pushed onto the first step section 35a with the step surface thereof as a reference, and the optical guide plate 25 is fixed to the second step section 35b in a state where the optical guide plate 25 is pushed onto the surface of the second step section 35b, so that a displacement rate of the optical axis between the semiconductor laser chip 31 and the optical guide plate 25 will be within the allowable error limits and a gap in the direction of the optical axis therebetween will be within the allowable error limits.

With this feature, a coupling loss due to an error in the displacement in the optical axis as well as to a gap error can be suppressed to a small value and optical transmission from the semiconductor laser chip 31 to the optical guide plate 25 is efficiently performed, whereby it is possible to efficiently propagate an output from a semiconductor laser to a solid-state laser medium.

Figure 11:
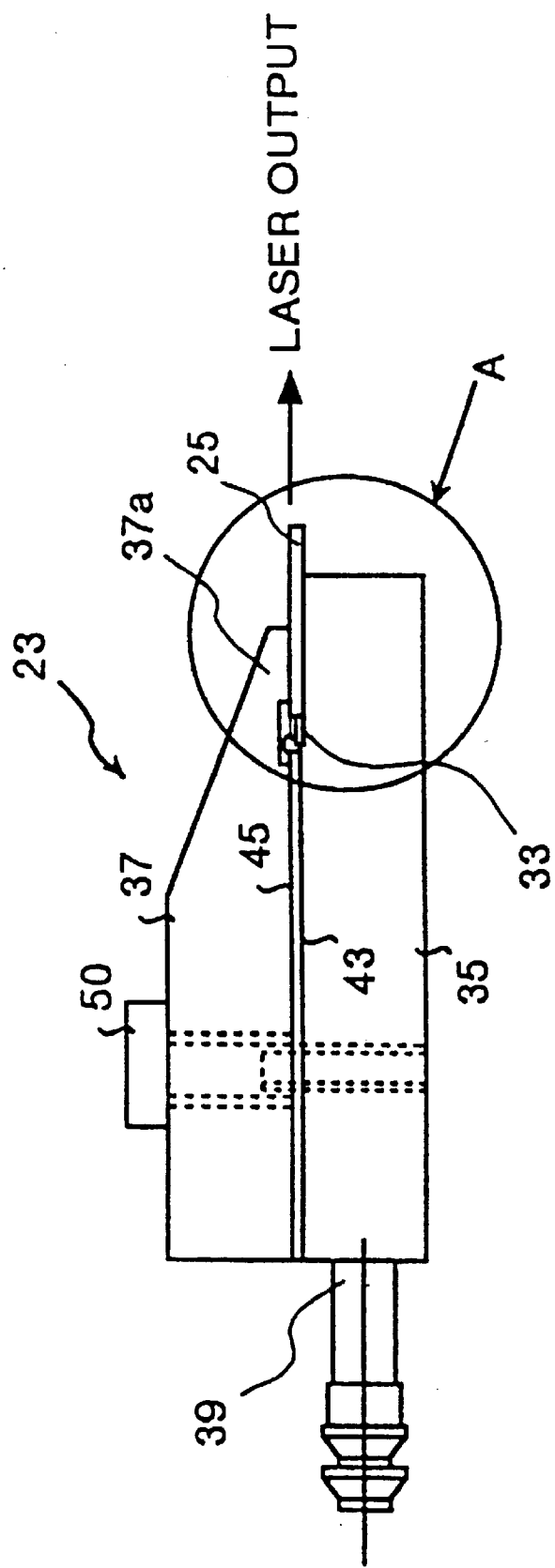
FIG. 11 is a front view showing a semiconductor excitation solid-state laser apparatus according to Embodiment 6 of the present invention.
Figure 12:
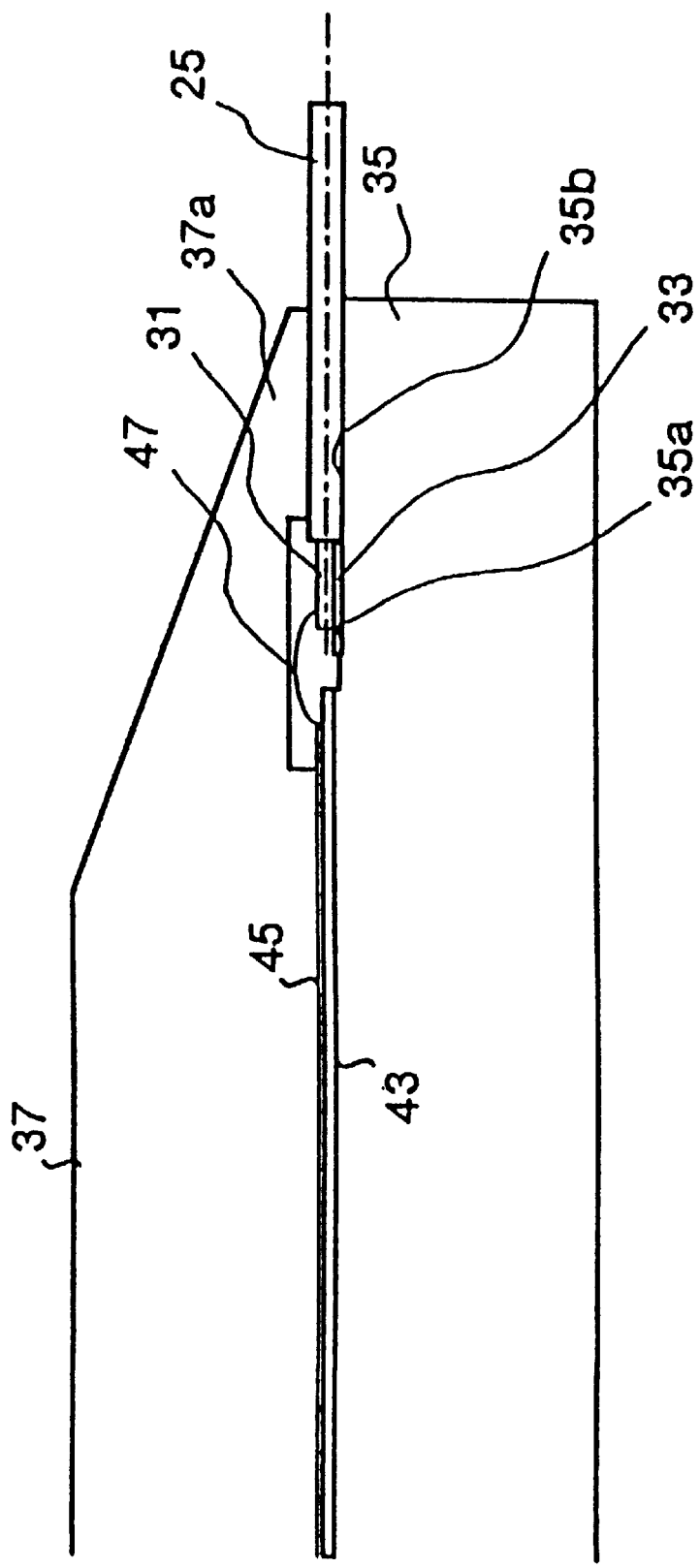
FIG. 12 is an enlarged view of the area A shown in FIG. 11.

FIG. 11 and FIG. 12 show a semiconductor excitation solid-state laser apparatus according to Embodiment 6 of the present invention respectively. It should be noted that, in FIG. 11 and FIG. 12, the same reference numerals are assigned to the sections corresponding to those in FIG. 9 and FIG. 10, and description thereof is omitted herein.

This embodiment is a modified example of Embodiment 5, in which an optical guide plate holding section 37a is provided in the front section of the package cover 37. The optical guide plate holding section 37a is positioned in the upper side of the second step section 35b so as to sandwich and hold the optical guide plate 25 arranged on the second step section 35b with the main body of the package 35.

In this embodiment, the optical guide plate 25 is sandwiched and held between the main body of the package 35 and the package cover 37, whereby a holding strength of the optical guide plate 25 thereby is enhanced. With this enhancement, it is possible to simplify assembly steps of the apparatus and to reduce a time required for the assembly.

Figure 13:
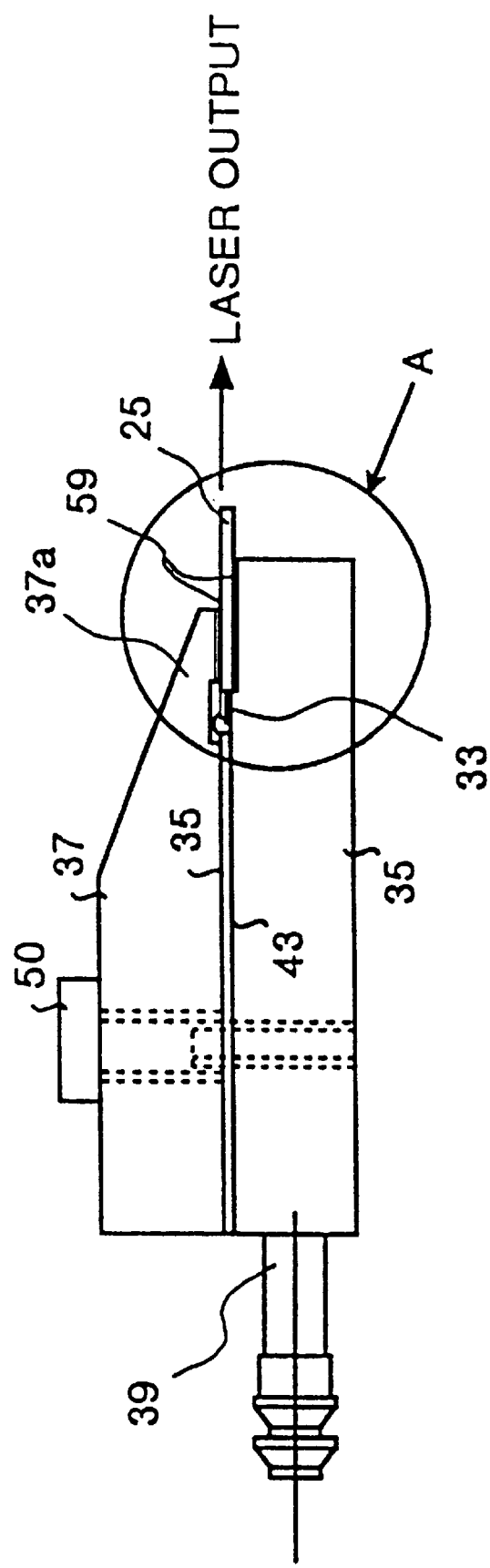
FIG. 13 is a front view showing a semiconductor excitation solid-state laser apparatus according to Embodiment 7 of the present invention.
Figure 14:
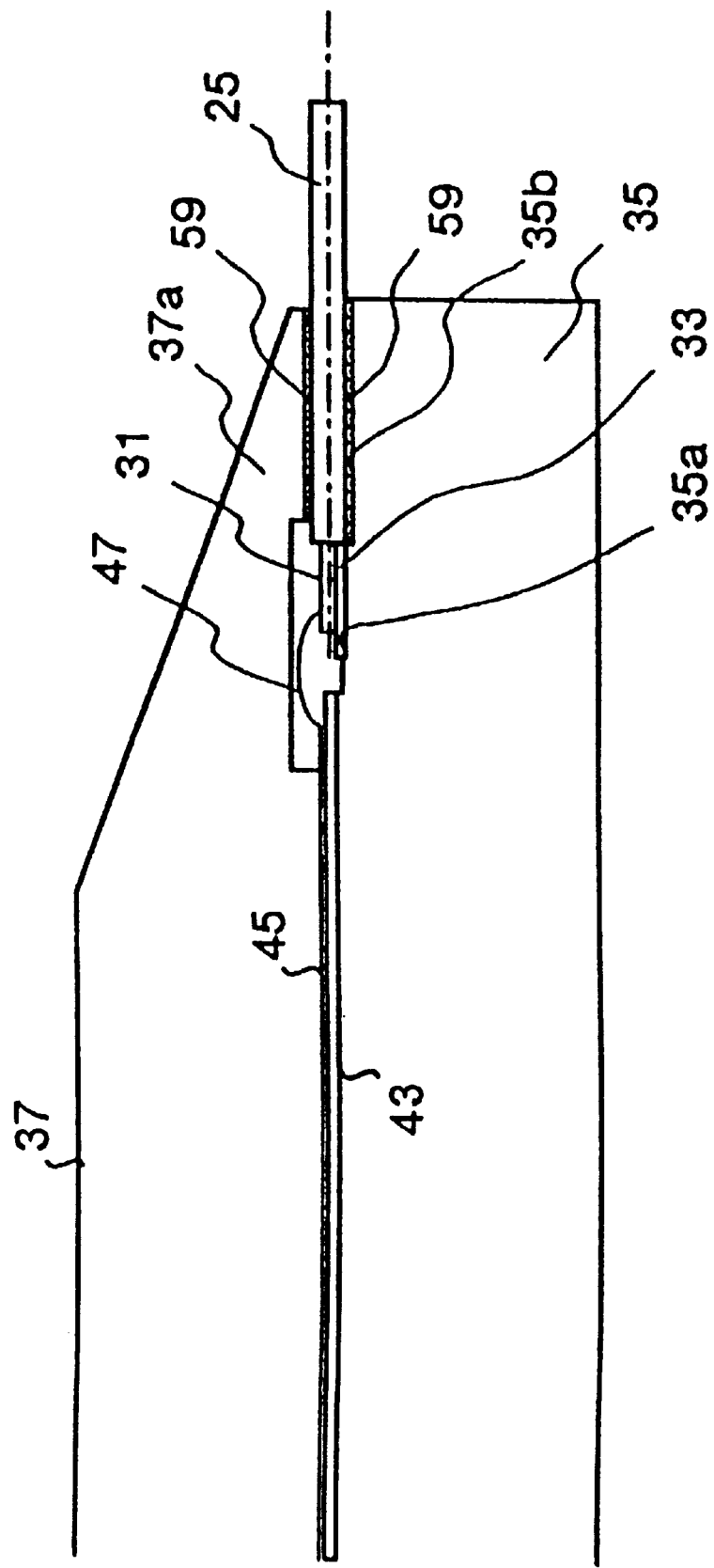
FIG. 14 is an enlarged view of the area A shown in FIG. 13.
Figure 15:
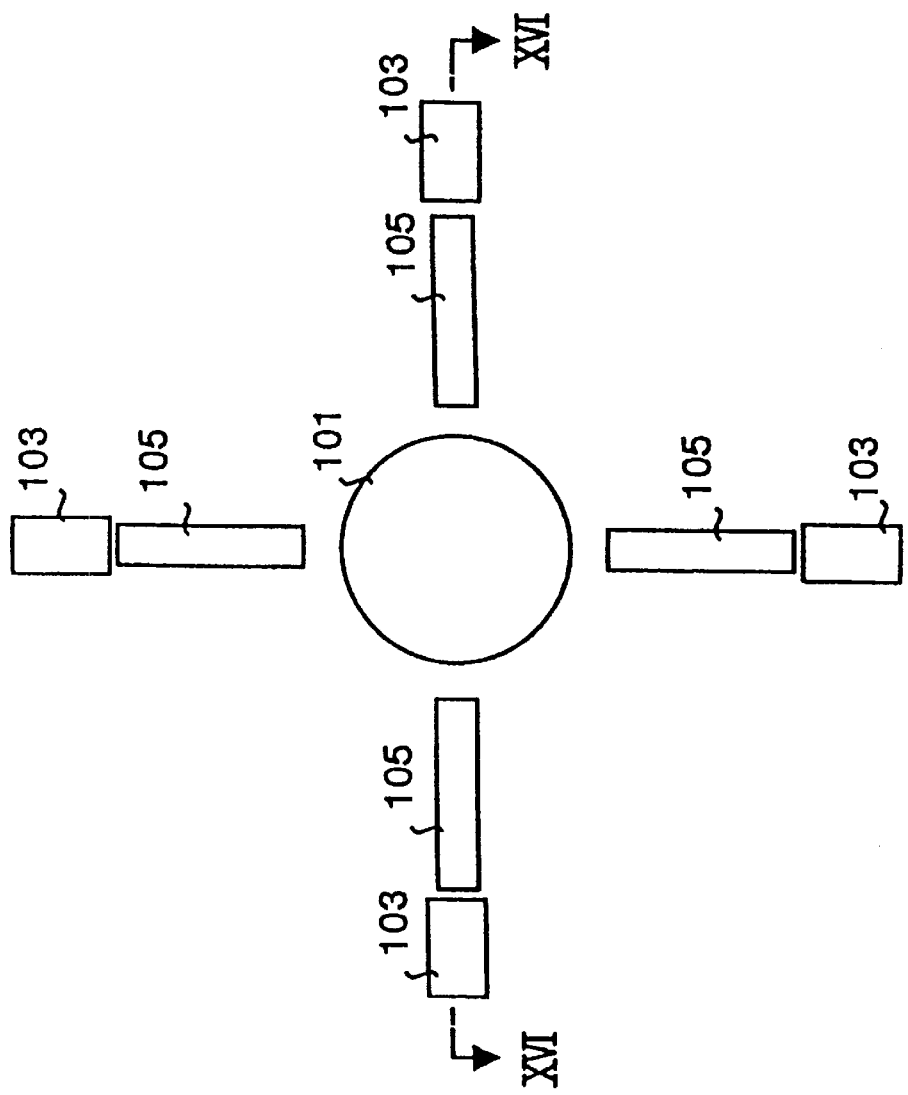
FIG. 15 is a front view showing a semiconductor excitation solid-state laser apparatus based on the conventional technology.
Figure 16:
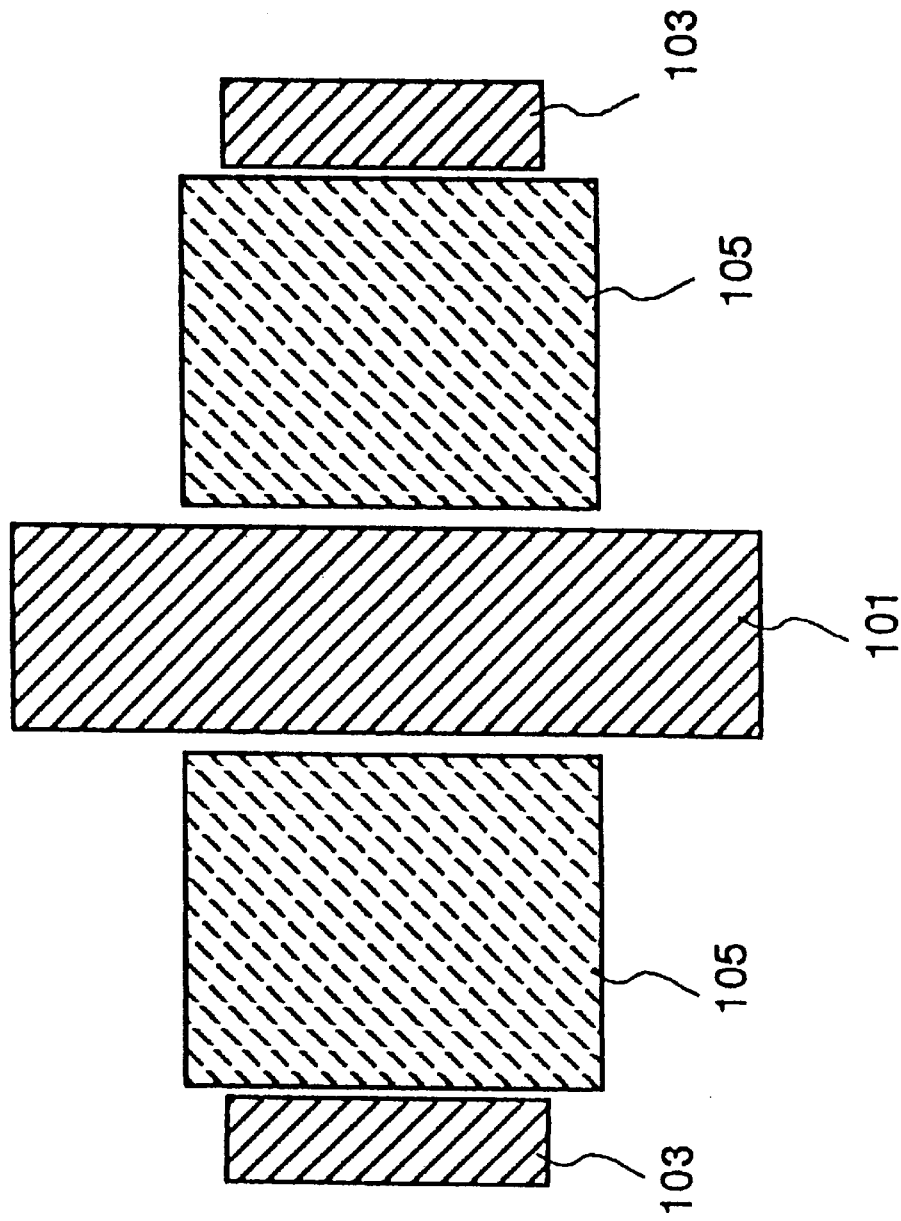
FIG. 16 is a cross-sectional view of the above apparatus taken along the line XVI—XVI shown in FIG. 15.
Figure 17:
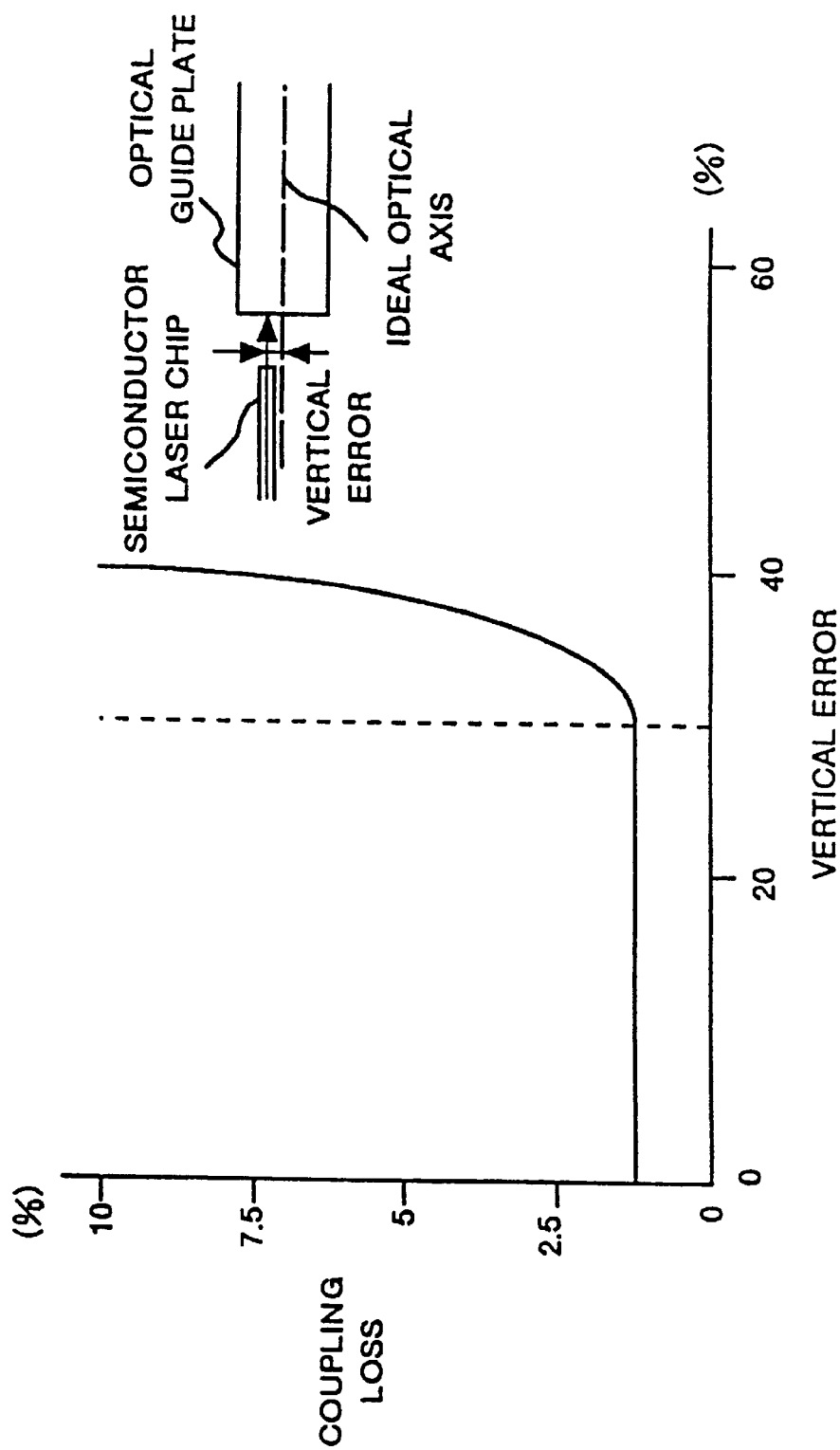
FIG. 17 is a graph showing coupling-loss characteristics due to a vertical error.
Figure 18:
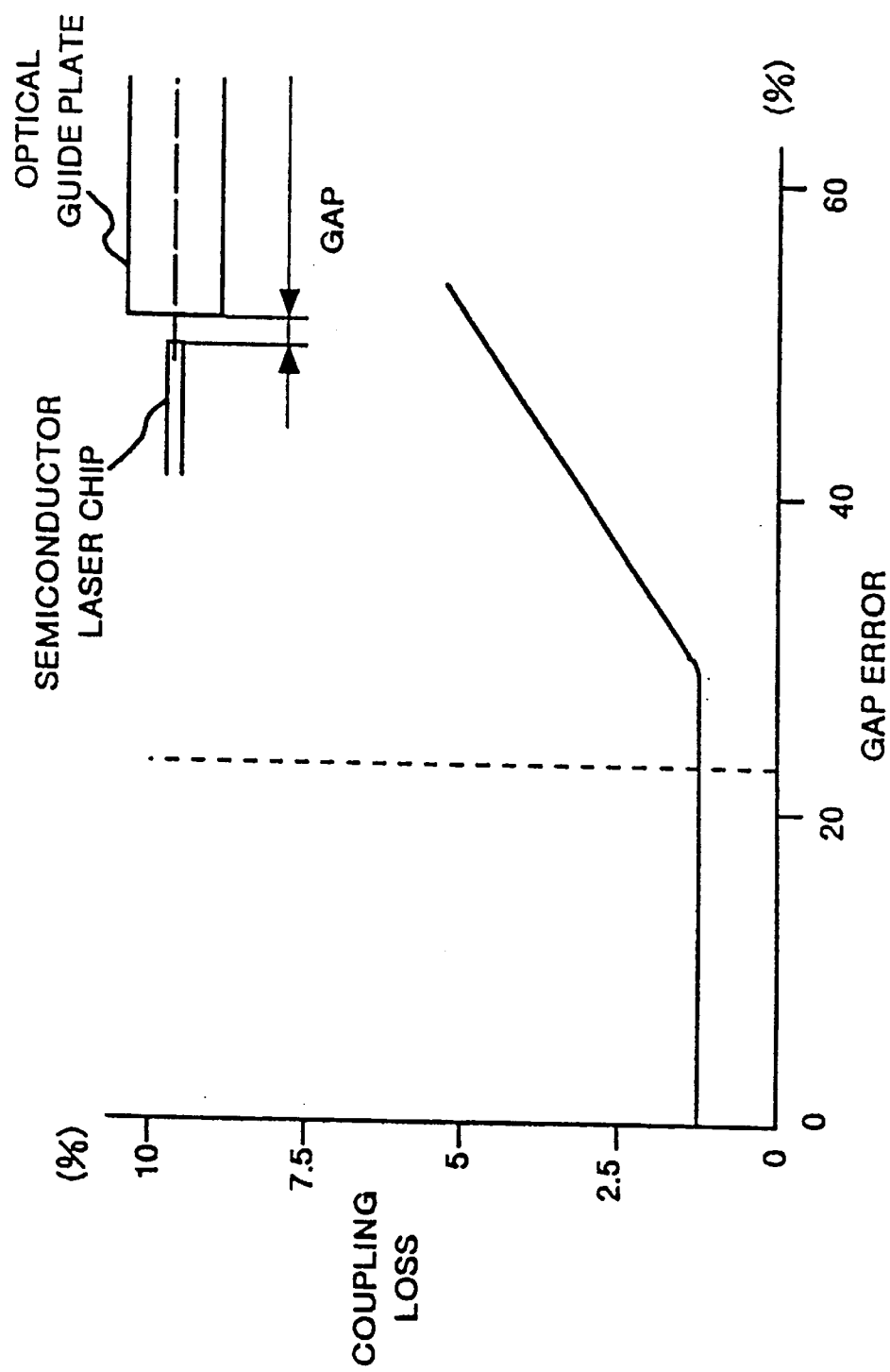
FIG. 18 is a graph showing coupling-loss characteristics due to a gap error.

FIG. 13 and FIG. 14 show a semiconductor excitation solid-state laser apparatus according to Embodiment 7 of the present invention respectively. It should be noted that, in FIG. 13 and FIG. 14, the same reference numerals are assigned to the sections corresponding to those in FIG. 11 and FIG. 12, and description thereof is omitted herein.

This embodiment is a modified example of Embodiment 6, in which there is provided a packing agent or an adhesive agent in a space between the second step section 35b of the main body of the package 35 and the optical guide plate 25 as well as in a space between the optical guide plate holding section 37a of the package cover 37 and the optical guide plate 25, and cushion layer 59 are provided therebetween with those agents. The packing agent or adhesive agent comprising the cushion layer 59 is made of some material such as a silicon based resin with a refractive index smaller than that of the optical guide plate 25.

In this embodiment, the packing agent or adhesive agent comprising the cushion layer 59 acts as a cushion material to prevent the optical guide plate 25 from breakage by the holding force.

A refractive index of the packing agent or the adhesive agent comprising the cushion layer 59 is smaller than that of the optical guide plate 25, and with this optical feature it is possible to suppress a loss due to optical leakage from the side face section of the optical guide plate 25 as well as reduction of optical transmission efficiency.

As clearly understood from the above description, with the semiconductor excitation solid-state laser apparatus according to one feature of the present invention, a cross-sectional area of the optical guide plate is larger in the side of the semiconductor laser and is getting smaller from the semiconductor laser side toward the side of the solid-state laser medium thereof, so that a large quantity of excited beam from the semiconductor laser is fetched into the optical guide plate, whereby a quantity of the excited beam going back to the optical guide plate from the solid-state laser medium is reduced, whereby an output from a semiconductor laser can efficiently be propagated to a solid-state laser medium.

With the semiconductor excitation solid-state laser apparatus according to another feature of the present invention, a cross-sectional area of the optical guide plate is larger in the side of the semiconductor laser thereof and is getting smaller from the semiconductor laser side toward the side of the solid-state laser medium according to change in thickness of the plate, so that a large quantity of excited beam from the semiconductor laser is fetched into the optical guide plate, and a quantity of the excited beam going back to the optical guide plate from the solid-state laser medium is reduced, whereby an output from a semiconductor laser can efficiently be propagated to a solid-state laser medium.

With the semiconductor excitation solid-state laser apparatus according to another feature of the present invention, by deciding a form of a beam receiving surface of the optical guide plate to be a concave form or a convex form according to a refractive index of the optical guide plate, a large quantity of excited beam from the semiconductor laser is fetched into the optical guide plate, and a quantity of the excited beam coming back to the optical guide plate from the solid-state laser medium is reduced, whereby an output from a semiconductor laser can efficiently be propagated to a solid-state laser medium.

With the semiconductor excitation solid-state laser apparatus according to another feature of the present invention, all the excited beam outputted from the optical guide plate is absorbed in the solid-state laser medium without leaking any portions thereof from a converging device to the outside thereof, whereby an output from a semiconductor laser can efficiently be propagated to a solid-state laser medium.

With the semiconductor excitation solid-state laser apparatus according to another feature of the present invention, all the beam excited in the semiconductor laser is directly introduced into the optical guide plate and the excited beam from the optical guide plate is absorbed in the whole area of the length of the solid-state laser medium, whereby an output from a semiconductor laser can efficiently be propagated to a solid-state laser medium.

With the semiconductor excitation solid-state laser apparatus according to another feature of the present invention, the excited beam having entered inside the optical guide plate is totally reflected inside thereof, so that any beam is possibly leaked from the side face thereof or the like to the outside thereof, whereby an output from a semiconductor laser can efficiently be propagated to a solid-state laser medium.

With the semiconductor excitation solid-state laser apparatus according to another feature of the present invention, uniformity of an excited beam in the axial direction is improved by an optical diffusion plate, whereby an output from a semiconductor laser can efficiently be propagated to a solid-state laser medium.

With the semiconductor excitation solid-state laser apparatus according to another feature of the present invention, a height spacer for adjusting displacement of an optical axis is specified so that a displacement rate of the optical axis between the semiconductor laser chip that the semiconductor laser has and the optical guide plate will be within a specified range of allowable error, a gap spacer for adjusting a gap is specified so that a gap in the direction of the optical axis therebetween will be within the specified range of allowable error, so that the displacement rate of the optical axis therebetween as well as the gap in the direction of the optical axis therebetween will be within the allowable error limits, a coupling loss due to an error in the displacement in the optical axis as well as to a gap error can be suppressed to a small value, and optical transmission from the semiconductor laser chip to the optical guide plate is efficiently performed, whereby an output from a semiconductor laser can efficiently be propagated to a solid-state laser medium.

With the semiconductor excitation solid-state laser apparatus according to another feature of the present invention, the height spacer is provided in a space between a bottom section of the main body of the package and the holding member of the optical guide plate, so that a displacement rate of the optical axis between the semiconductor laser chip and the optical guide plate will be within the allowable error limits, the gap spacer is provided in a space between the front section of the main body of the package and the holding member of the optical guide plate, so that a gap in the direction of the optical axis between the semiconductor laser chip and the optical guide plate will be within the allowable error limits, a coupling loss due to an error in the displacement in the optical axis as well as to a gap error can be suppressed to a small value, and optical transmission from the semiconductor laser chip to the optical guide plate is efficiently performed, whereby an output from a semiconductor laser can efficiently be propagated to a solid-state laser medium.

With the semiconductor excitation solid-state laser apparatus according to another feature of the present invention, the optical guide plate is supported by the gap spacer which is pushed onto the main body of the package of the semiconductor laser to adjust a gap so that the gap in the direction of the optical axis between the semiconductor laser chip and the optical guide plate will be within a specified range of allowable error, the height spacer is provided in a space between the gap spacer and the holding member for the optical guide plate, so that the displacement rate of the optical axis between the semiconductor laser chip and the optical guide plate will be within the allowable error limits, a coupling loss due to an error in the displacement in the optical axis as well as to a gap error can be suppressed to a small value, and optical transmission from the semiconductor laser chip to the optical guide plate is efficiently performed, whereby an output from a semiconductor laser can efficiently be propagated to a solid-state laser medium.

With the semiconductor excitation solid-state laser apparatus according to another feature of the present invention, a submount is positioned and arranged on a submount positional arrangement section and an optical guide plate is positioned and arranged on the positional arrangement section for the optical guide plate, and with both of the positional arrangement, the displacement rate of the optical axis between the semiconductor laser chip and the optical guide plate will be within a specified range of allowable error, and the gap in the direction of the optical axis therebetween will be within the allowable error limits, a coupling loss due to an error in the displacement in the optical axis as well as to a gap error can be suppressed to a small value, and optical transmission from the semiconductor laser chip to the optical guide plate is efficiently performed, whereby an output from a semiconductor laser can efficiently be propagated to a solid-state laser medium.

With the semiconductor excitation solid-state laser apparatus according to another feature of the present invention, a submount is positioned and arranged on the submount positional arrangement section provided by a step section obtained by subjecting machining to the main body of the package, an optical guide plate is positioned and arranged on the positional arrangement section for the optical guide plate provided by a step section obtained by machining the main body of the package, and with both of the positional arrangement, the displacement rate of the optical axis between the semiconductor laser chip and the optical guide plate will be within a specified range of allowable error and the gap in the direction of the optical axis therebetween will be within the allowable error limits, a coupling loss due to an error in the displacement in the optical axis as well as to a gap error can be suppressed to a small value, and optical transmission from the semiconductor laser chip to the optical guide plate is efficiently performed, whereby an output from a semiconductor laser can efficiently be propagated to a solid-state laser medium.

With the semiconductor excitation solid-state laser apparatus according to another feature of the present invention, the optical guide plate is sandwiched and held between the main body of a package and a package cover, so that holding strength of the optical guide plate is enhanced and assembly steps of the apparatus can be simplified, whereby a time required for the assembly can be reduced.

With the semiconductor excitation solid-state laser apparatus according to another feature of the present invention, the optical guide plate with a packing agent or an adhesive agent is sandwiched and held between the main body of the package and the package cover, so that the packing agent or adhesive agent can act as a cushion material to prevent a breakage of the optical guide plate due to an excessive sandwiching force. With this feature, it is possible to simplify assembly steps of the apparatus and to reduce a time required for the assembly.

With the semiconductor excitation solid-state laser apparatus according to another feature of the present invention, a refractive index of the packing agent or the adhesive agent is smaller than that of the optical guide plate, and with this optical feature, an optical leakage loss from the side face section of the optical guide plate is suppressed, and reduction of optical transmission efficiency can be suppressed.

This application is based on Japanese patent application No. HEI 9-170547 filed in the Japanese Patent Office on Jun. 26, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A semiconductor excitation solid-state laser apparatus comprising:
   a solid-state laser medium;
   a semiconductor laser operable as a laser excitation source; and
   an optical guide plate for propagating a beam generated by said semiconductor laser to said solid-state laser medium, wherein said optical guide plate has a cross-sectional area crossing a main optical axis for propagation of the beam at a right angle which is largest at a first end face of said optical guide plate through which said beam is received from said semiconductor laser and gradually decreases to a second end face of said optical guide plate through which said beam is output to said solid-state laser medium.

2. A semiconductor excitation solid-state laser apparatus according to claim 1, further comprising a reflection coating which is formed on a side wall of a of said optical guide plate for totally reflecting the beam generated by the semiconductor laser without loss through said side wall surface as the beam is propagated through said optical guide plate.

3. A semiconductor excitation solid-state laser apparatus according to claim 1, further comprising an optical diffusion plate disposed on the first end face of said optical guide plate.

4. A semiconductor excitation solid-state laser apparatus according to claim 1, wherein a width of said optical guide plate is largest at a first end face of said optical guide plate through which said beam is received from said semiconductor laser and gradually decreases to a second end face of optical guide plate through which said beam is output to said solid-state laser medium.

5. A semiconductor excitation solid-state laser apparatus comprising:

a solid-state laser medium;

a semiconductor laser operable as a laser excitation source; and an optical guide plate for propagating a beam generated by said semiconductor laser to said solid-state laser medium, said optical guide plate having an end face through which said beam is received from said semiconductor laser, wherein said end face has a concave shape if a refractive index $n_g$ of said optical guide plate satisfies the expression $$\text{arc } \cos(1/n_g) - \text{arc } \sin(1/n_g) - \beta > 0, \text{ and}$$

said end face having a convex shape if said refractive index $n_g$ satisfies the expression $$\text{arc } \cos(1/n_g) - \text{arc } \sin(1/n_g) - \beta < 0,$$

where $\beta$ is an angle of inclination side faces of said optical guide plate against the direction of the main optical axis for propagation of the excited beam outputted from said semiconductor laser.

6. A semiconductor excitation solid-state laser apparatus according to claim 5, further comprising a reflection coating which is formed on a side wall of a of said optical guide plate for totally reflecting the beam generated by the semiconductor laser without loss through said side wall surface as the beam is propagated through said optical guide plate.

7. A semiconductor excitation solid-state laser apparatus according to claim 5, further comprising an optical diffusion plate disposed on the end face of said optical guide plate.

8. A semiconductor excitation solid-state laser apparatus comprising:

a solid-state laser medium;

a semiconductor laser operable as a laser excitation source; and an optical guide plate for propagating a beam generated by said semiconductor laser to said solid-state laser medium; and a tubular converging device surrounding said solid-state laser medium for reflecting the beam output from said optical guide plate onto said solid-state laser medium, wherein the entire periphery of said solid-state laser medium is completely surrounded with said converging device and said optical guide plate.

9. A semiconductor excitation solid-state laser apparatus according to claim 8, further comprising a reflection coating which is formed on a side wall of a of said optical guide plate for totally reflecting the beam generated by the semiconductor laser without loss through said side wall surface as the beam is propagated through said optical guide plate.

10. A semiconductor excitation solid-state laser apparatus according to claim 8, further comprising an optical diffusion plate disposed on the end face of said optical guide plate.

11. A semiconductor excitation solid-state laser apparatus comprising:

a solid-state laser medium;

a semiconductor laser operable as a laser excitation source, said semiconductor laser having a slit-shaped beam emitting section for emitting an excited beam; and an optical guide plate for propagating a beam generated by said semiconductor laser to said solid-state laser medium, wherein a length an first end face of said optical guide plate through which said beam is received from said semiconductor laser is substantially equal to a length of said slit-shaped beam emitting section of said semiconductor laser, and a length of a second end face of said optical guide path through which said beam is output to said solid-state laser medium is substantially equal to the length of said solid-state laser medium.

12. A semiconductor excitation solid-state laser apparatus according to claim 11, further comprising a reflection coating which is formed on a side wall of a of said optical guide plate for totally reflecting the beam generated by the semiconductor laser without loss through said side wall surface as the beam is propagated through said optical guide plate.

13. A semiconductor excitation solid-state laser apparatus according to claim 11, further comprising an optical diffusion plate disposed on the first end face of said optical guide plate.

14. A semiconductor excitation solid-state laser apparatus comprising:

a solid-state laser medium;

a semiconductor laser operable as a laser excitation source;

an optical guide plate for propagating a beam generated by said semiconductor laser to said solid-state laser medium;

a holding member attached to and supporting said optical guide path;

a height spacer interposed between said semiconductor laser and said holding member; and a gap spacer interposed between said semiconductor laser and height spacer, wherein said height spacer and said gap spacer control displacement of an optical axis between said semiconductor laser and said optical guide plate.

15. A semiconductor excitation solid-state laser apparatus according to claim 14, wherein said semiconductor laser comprises a main body and a semiconductor laser chip mounted on said main body, said height spacer is interposed between a bottom section of said main body and the holding member, and said gap spacer is interposed between a front section of said main body of the package and the holding member.

16. A semiconductor excitation solid-state laser apparatus according to claim 14, wherein said optical guide plate is attached to said gap spacer, a horizontal displacement between the semiconductor laser and the optical guide plate is adjusted by moving said gap spacer, and said height spacer is interposed between said gap spacer and the holding member.

17. A semiconductor excitation solid-state laser apparatus comprising:

a solid-state laser medium;

a semiconductor laser operable as a laser excitation source, said semiconductor laser comprising a main body, a submount disposed on said main body, and a semiconductor laser chip disposed on said submount;

an optical guide plate for propagating a beam generated by said semiconductor laser to said solid-state laser medium, wherein said submount is disposed on a first positional arrangement section of said main body of said semiconductor laser, and said optical guide plate is disposed on a second positional arrangement section of said main body of said semiconductor laser.

18. A semiconductor excitation solid-state laser apparatus according to claim 17, wherein said first positional arrangement section and said second positional arrangement section are formed by step sections each obtained by machining said main body.

19. A semiconductor excitation solid-state laser apparatus according to claim 17, wherein said semiconductor laser further comprises a package cover for protecting said semiconductor laser chip mounted on said submount, and said package cover has an optical guide plate holding section for holding said optical guide plate disposed on said second positional arrangement section of said main body.

20. A semiconductor excitation solid-state laser apparatus according to claim 19, wherein said semiconductor laser further comprises a packing agent disposed between said main body and said optical guide plate and disposed between said package cover and said optical guide plate.

21. A semiconductor excitation solid-state laser apparatus according to claim 20; wherein said packing agent comprises a material with a refractive index smaller than a refractive index of said optical guide plate.

22. A semiconductor excitation solid-state laser apparatus according to claim 19, wherein said semiconductor laser further comprises an adhesive agent disposed between said main body and said optical guide plate and disposed between said package cover and said optical guide plate.

23. A semiconductor excitation solid-state laser apparatus according to claim 22; wherein said adhesive agent comprises a material with a refractive index smaller than a refractive index of said optical guide plate.

24. A semiconductor excitation solid-state laser apparatus according to claim 1; wherein said first end face of said optical guide plate has a concave shape.

* * * * *